(12) United States Patent
Daubenspeck et al.

(10) Patent No.: US 12,729,040 B2
(45) **Date of Patent: *Sep. 8, 2026**

(54) STACKABLE QUARTER-SIZE PLASTIC PLATFORM AND ASSOCIATED METHODS

(71) Applicant: CHEP Technology Pty Limited, Sydney (AU)

(72) Inventors: Bradley Wayne Daubenspeck, Windermere, FL (US); Nigel Sankar, Oakville (CA)

(73) Assignee: CHEP Technology Pty Limited, Sydney (AU)

(*) Notice: Subject to any disclaimer, the term of this patent is extended or adjusted under 35 U.S.C. 154(b) by 99 days.

This patent is subject to a terminal disclaimer.

(21) Appl. No.: 18/662,529

(22) Filed: May 13, 2024

(65) Prior Publication Data

US 2024/0294303 A1 Sep. 5, 2024

Related U.S. Application Data

(63) Continuation-in-part of application No. 18/323,848, filed on May 25, 2023, now Pat. No. 12,012,251, (Continued)

(51) Int. Cl.
*B65D 19/40* (2006.01)
*G06Q 10/0833* (2023.01)

(52) U.S. Cl.
CPC ......... *B65D 19/40* (2013.01); *G06Q 10/0833* (2013.01); *B65D 2203/10* (2013.01); (Continued)

(58) Field of Classification Search
CPC .... B65D 2519/0094; B65D 2519/0096; B65D 19/38; B65D 19/40; B65D 2203/10; G06Q 10/0833
See application file for complete search history.

(56) References Cited

U.S. PATENT DOCUMENTS 5,341,748 A 8/1994 Liu
5,408,937 A 4/1995 Knight, IV et al.
(Continued)

FOREIGN PATENT DOCUMENTS

CL 2020000321 A1 6/2020
CL 2020000328 A1 6/2020
(Continued)

OTHER PUBLICATIONS

International Search Report and Written Opinion for Patent Cooperation Treaty Application No. PCT/US2025/028560, dated Jul. 30, 2025, 14 pages.

(Continued)

*Primary Examiner* — Daniel J Rohrhoff
(74) *Attorney, Agent, or Firm* — Alston & Bird LLP

(57) ABSTRACT

A platform includes a top deck with spaced apart platform support leg openings extending therethrough, and platform support legs extending from a lower surface of the top deck and aligned with the platform support leg openings. A shelf provides support to a bottom surface of a platform support leg from an identical platform when stacked thereon. A pair of extensions extend outwards from a bottom surface of the lower portion, with the opening in the upper portion providing clearance for the pair of extensions on the platform support leg of the identical platform when stacked thereon. The platform includes a platform tracking device including an exterior housing assembly that is positioned at least partially within the top deck and that encloses processing circuitry, memory, one or more sensors, a communication element, and a power supply.

9 Claims, 17 Drawing Sheets

Related U.S. Application Data which is a continuation of application No. 17/650,259, filed on Feb. 8, 2022, now Pat. No. 11,697,524.

(60) Provisional application No. 63/147,864, filed on Feb. 10, 2021.

(52) U.S. Cl.
CPC ................ *B65D 2519/0094* (2013.01); *B65D 2519/0096* (2013.01)

(56) References Cited

U.S. PATENT DOCUMENTS

| | | | | |
|---|---|---|---|---|
| 5,606,921 | A | 3/1997 | Elder et al. | |
| 6,220,183 | B1 | 4/2001 | Schwitzky | |
| 6,997,113 | B1 | 2/2006 | Harding et al. | |
| 7,342,496 | B2 * | 3/2008 | Muirhead | G06K 19/07758 340/568.5 |
| 7,714,708 | B2 * | 5/2010 | Brackmann | B60P 3/14 180/290 |
| 7,819,068 | B2 | 10/2010 | Apps et al. | |
| 7,856,932 | B2 | 12/2010 | Stahl et al. | |
| 9,387,953 | B2 | 7/2016 | Takyar et al. | |
| 10,232,979 | B2 | 3/2019 | Takyar et al. | |
| 10,495,764 | B2 * | 12/2019 | Bastian | G06Q 10/08 |
| 11,244,378 | B2 * | 2/2022 | Pannicke | H04W 4/021 |
| 11,697,524 | B2 * | 7/2023 | Daubenspeck | B65D 19/004 108/53.1 |
| 12,012,251 | B2 * | 6/2024 | Daubenspeck | B65D 19/385 |
| 2005/0241548 | A1 | 11/2005 | Muirhead | |
| 2005/0263043 | A1 | 12/2005 | Proudlove | |
| 2008/0103944 | A1 * | 5/2008 | Hagemann | G06Q 10/0833 108/51.11 |
| 2014/0000493 | A1 | 1/2014 | Apps et al. | |
| 2014/0210614 | A9 * | 7/2014 | Muirhead | H04W 4/02 340/539.13 |
| 2017/0208426 | A1 * | 7/2017 | Komoni | H04W 4/80 |
| 2017/0297765 | A1 | 10/2017 | Guerry et al. | |
| 2019/0055055 | A1 | 2/2019 | Wood et al. | |
| 2019/0375544 | A1 | 12/2019 | Kuhmann et al. | |
| 2021/0039830 | A1 | 2/2021 | Kalinowski et al. | |
| 2022/0250793 | A1 | 8/2022 | Daubenspeck et al. | |
| 2022/0289427 | A1 | 9/2022 | Coubray | |
| 2023/0294872 | A1 | 9/2023 | Daubenspeck et al. | |

FOREIGN PATENT DOCUMENTS

| | | | |
|---|---|---|---|
| CN | 203921479 | U | 11/2014 |
| CN | 105035477 | A | 11/2015 |
| CN | 205023073 | U | 2/2016 |
| CN | 110337408 | A | 10/2019 |
| CN | 211076781 | U | 7/2020 |
| DE | 9108103 | U1 | 10/1992 |
| GB | 2565223 | A | 2/2019 |
| JP | S63114929 | A | 7/1988 |
| JP | 4064651 | B2 | 3/2008 |
| KR | 2018-0056350 | A | 5/2018 |
| WO | WO 2022/135154 | A1 | 6/2022 |

OTHER PUBLICATIONS

U.S. Appl. No. 18/323,848, filed May 25, 2023, 2023-0294872, Allowed.

U.S. Appl. No. 17/650,259, filed Feb. 8, 2022, U.S. Pat. No. 11,697,524, Issued.

Extended European Search Report for Application No. 22753541.6, dated Nov. 27, 2024, 8 pages.

Chilean Office Action for Application No. 202301996, dated Dec. 16, 2024, 24 pages.

U.S. Appl. No. 11/697,524 B2, filed Jul. 11, 2023, Daubenspeck et al.

International Search Report and Written Opinion for International Application No. PCT/US2022/070573, dated May 6, 2022, (8 pages), United States Patent and Trademark Office, US.

Chinese Office Action for Application No. 202280014088.5, Oct. 10, 2025, 9 pages.

Japanese Office Action for Application No. 2024-129964, dated Feb. 10, 2026.

* cited by examiner

STACKABLE QUARTER-SIZE PLASTIC PLATFORM AND ASSOCIATED METHODS

RELATED APPLICATION

This application is a continuation-in-part of U.S. Non-provisional patent application Ser. No. 18/323,848, filed May 25, 2023; which application is itself a continuation of U.S. Nonprovisional patent application Ser. No. 17/650,259, filed Feb. 8, 2022 (and now U.S. Pat. No. 11,697,524, granted Jul. 11, 2023); which application further claims priority to and the benefit of U.S. Provisional Patent Application Ser. No. 63/147,864 filed Feb. 10, 2021; the contents of all of which as are hereby incorporated herein in their entireties by reference.

TECHNICAL FIELD

The present disclosure relates to the field of pallets, and more particularly, to a stackable quarter-size plastic platform.

BACKGROUND

Retail stores often prefer the use of fractional pallets when displaying products that are for customer purchase. Fractional pallets are typically one-quarter to one-half the size of full-size pallets. Fractional pallets have a significantly smaller footprint, which allows retail stores to display a greater variety of products within the same size area as full-size pallets.

In addition, retail stores often prefer the use of fractional plastic pallets instead of fractional wood pallets. Fractional plastic pallets are more aesthetically pleasing than fractional wood pallets, as well as being more sanitary.

Even in view of current fractional plastic pallets, there is still a need for such pallets that can be easily moved by pallet handling equipment, particularly without any products loaded thereon and when stacked with other fractional plastic pallets. When fractional plastic pallets are loaded with products to be transported, there is also a need to enable product display in retail stores that is aesthetically acceptable. Since the products to be carried by fractional plastic pallets at times may be relatively heavy, the load carrying capacity of the pallets should not be sacrificed while also providing accessibility.

Fractional plastic pallets allow for the movement of individual products between locations with varying environmental attributes. For example, each fractional plastic pallet may include a set of products loaded thereon that are associated with one or more end users. Each product may have different storage conditions and/or other criteria that may impact the product as the product is moved between different locations. Pallet tracking techniques are therefore needed to ensure the proper storage, maintenance, and routing of a product and mitigate environmental impacts to the product as it traverses a route, is provided as a display, and/or the like.

SUMMARY

A platform includes a top deck that includes an upper surface and an opposing lower surface, with a plurality of spaced apart platform support leg openings extending through the upper and lower surfaces. A plurality of platform support legs extend from the lower surface of the top deck and are aligned with the plurality of platform support leg openings. Each platform support leg includes an upper portion and a lower portion.

The upper portion is adjacent the lower surface of the top deck and has an opening extending through a first pair of spaced apart sidewalls. The opening is aligned with a respective one of the platform support leg openings in the top deck. The lower portion is adjacent the upper portion and includes a shelf that separates the opening in the upper portion from the lower portion. The shelf is configured to provide support to a bottom surface of a platform support leg from an identical platform when stacked thereon. A pair of extensions extend outwards from a bottom surface of the lower portion, with the opening in the upper portion providing clearance for the pair of extensions on the platform support leg of the identical platform when stacked thereon.

The pair of extensions on the lower portion may be aligned with the opening in the upper portion of each platform support leg.

The pair of extensions on the lower portion may extend beyond a width of the opening in the upper portion of each platform support leg.

The pair of extensions on the identical platform when stacked thereon may extend beyond the width of the opening in the upper portion of each platform support leg.

The lower portion of each platform support leg may include a first pair of spaced apart sidewalls aligned with the first pair of spaced apart sidewalls in the upper portion, with both of the first pair of sidewalls having a tapered width toward the pair of extensions.

The upper and lower portions of each platform support leg may include a second pair of spaced apart sidewalls, with both of the second pair of sidewalls having a same width.

The shelf may extend between the bottom surface of the lower portion to the opening in the upper portion of each platform support leg. An upper surface of the shelf may include a ribbed structure.

Each platform support leg opening in the top deck may include a first pair of spaced apart sidewalls aligned with the first pair of spaced apart sidewalls in the upper portion of a corresponding platform support leg, and a second pair of spaced apart sidewalls adjacent the first pair of spaced apart sidewalls. The second pair of sidewalls may include spaced apart peaks extending into the platform support leg opening, with the peaks functioning as guides for when the corresponding platform support leg of the identical platform is stacked thereon.

The first pair of sidewalls are spaced apart to allow clearance for the pair of extension on the platform support leg of the identical platform when stacked thereon.

The upper and lower portions of each platform support leg may include a second pair of spaced apart sidewalls aligned with the second pair of spaced apart sidewalls in the platform support leg opening. The second pair of sidewalls may include spaced apart peaks extending outwards from the second pair of sidewalls. The spaced apart peaks may be staggered with respect to the pair of spaced apart peals in the platform support leg opening to function as guides for when the corresponding platform support leg of the identical platform is stacked thereon.

The top deck may include at least one product display attachment slot configured to receive a tab from at least one product display so as to allow the at least one product display to be held in place.

Another aspect is directed to method for making a platform as described above. The method includes forming a top deck that includes an upper surface and an opposing lower surface, with a plurality of spaced apart platform support leg openings extending through the upper and lower surfaces. The method further includes forming a plurality of platform support legs extending from the lower surface of the top deck and aligned with the plurality of platform support leg openings.

Each platform support leg includes an upper and lower portion. The upper portion adjacent the lower surface of the top deck and has an opening extending through a first pair of spaced apart sidewalls, with the opening aligned with a respective one of the platform support leg openings in the top deck. The lower portion is adjacent the upper portion and includes a shelf that separates the opening in the upper portion from the lower portion, with the shelf configured to provide support to a bottom surface of a platform support leg from an identical platform when stacked thereon. A pair of extensions extend outwards from a bottom surface of the lower portion, with the opening in the upper portion providing clearance for the pair of extensions on the platform support leg of the identical platform when stacked thereon.

Another aspect is directed to a trackable platform. The platform comprises a top deck that includes an upper surface and an opposing lower surface, with a plurality of spaced apart platform support leg openings extending through the upper and lower surfaces; a plurality of platform support legs extending from the lower surface of said top deck and aligned with the plurality of platform support leg openings, each platform support leg comprising an upper portion adjacent the lower surface of said top deck and having an opening extending through a first pair of spaced apart sidewalls, and a lower portion adjacent the upper portion and including a pair of extensions extending outwards from a bottom surface of the lower portion, with the opening in the upper portion providing clearance for the pair of extensions on the platform support leg of the identical platform when stacked thereon; and a platform tracking device comprising an exterior housing assembly that is positioned at least partially within the top deck and encloses processing circuitry, memory, one or more sensors, a communication element, and a power supply.

The communication element may comprise a radio frequency (RF) transmitter and an RF receiver configured to operate according to a wireless data transfer standard. The wireless data transfer standard may comprise a Category M (CAT-M) standard, a Narrowband-Internet of Things (NB-IoT) standard, a Wireless Fidelity (Wi-Fi) standard, or a Bluetooth Low Energy (BLE) standard. The one or more sensors may comprise a temperature sensor, an accelerometer, a magnetometer, or a location tracking component.

The platform tracking device may be mounted within the top deck by one or more mounting screws. The platform tracking device may be positioned within a tracking device gap of the top deck. the tracking device gap may extend a distance within the top deck from the lower surface. One or more dimensions of the tracking device gap may be based at least in part on one or more dimensions of the exterior housing assembly. For instance, the distance may be greater than or equal to a depth of the exterior housing assembly.

Yet another aspect is directed to a method for tracking a platform. The method includes receiving, by a platform tracking device, a transmit frequency identifying a period of time between one or more radio transmissions by the platform tracking device; receiving, by the platform tracking device, one or more data parameters; receiving, by the platform tracking device, sensor data; and providing, by the platform tracking device, a radio transmission indicative of a portion of the sensor data based at least in part on the transmit frequency and the one or more data parameters.

The platform tracking device may comprise a plurality of sensors and the sensor data may be received by the plurality of sensors at one or more sensor-based frequencies that are different than the transmit frequency. Providing the radio transmission indicative of the portion of the sensor data may include determining that an elapsed time from a previous radio transmission satisfies the period of time and in response to the elapsed time satisfying the period of time, generating the radio transmission based at least in part on one or more most recent sensor measurements from the plurality of sensors and providing the radio transmission to a remote system.

The platform tracking device may comprise a plurality of sensors respectively configured to generate sensor data of a plurality of different sensor data types. For example, the plurality of sensors may comprise a temperature sensor, an accelerometer, a magnetometer, or a location tracking component. The one or more data parameters may identify one or more selected data types of the plurality of different sensor data types. The portion of the sensor data may be based at least in part on the one or more selected data types.

The location tracking component may be configured to generate location data associated with one or more location data types and the one or more data parameters may identify a selected location data type of the one or more location data types. The one or more location data types may comprise a cellular-based location type, a Wi-Fi-based location type, and/or a GNSS-based type.

The method may further comprise storing, by the platform tracking device, a data log indicative of the portion of the sensor data based at least in part on the transmit frequency and the one or more data parameters. The data log may be stored in response to a connectivity fault between the platform tracking device and a remote system.

Yet another aspect is directed to one or more non-transitory computer-readable storage media including instructions that, when executed by one or more processors, cause the one or more processors to receive, by a platform tracking device, a transmit frequency identifying a period of time between one or more radio transmissions by the platform tracking device; receive, by the platform tracking device, one or more data parameters; receive, by the platform tracking device, sensor data; and provide, by the platform tracking device, a radio transmission indicative of a portion of the sensor data based at least in part on the transmit frequency and the one or more data parameters.

The one or more processors may be further caused to store, by the platform tracking device, a data log indicative of the portion of the sensor data based at least in part on the transmit frequency and the one or more data parameters.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
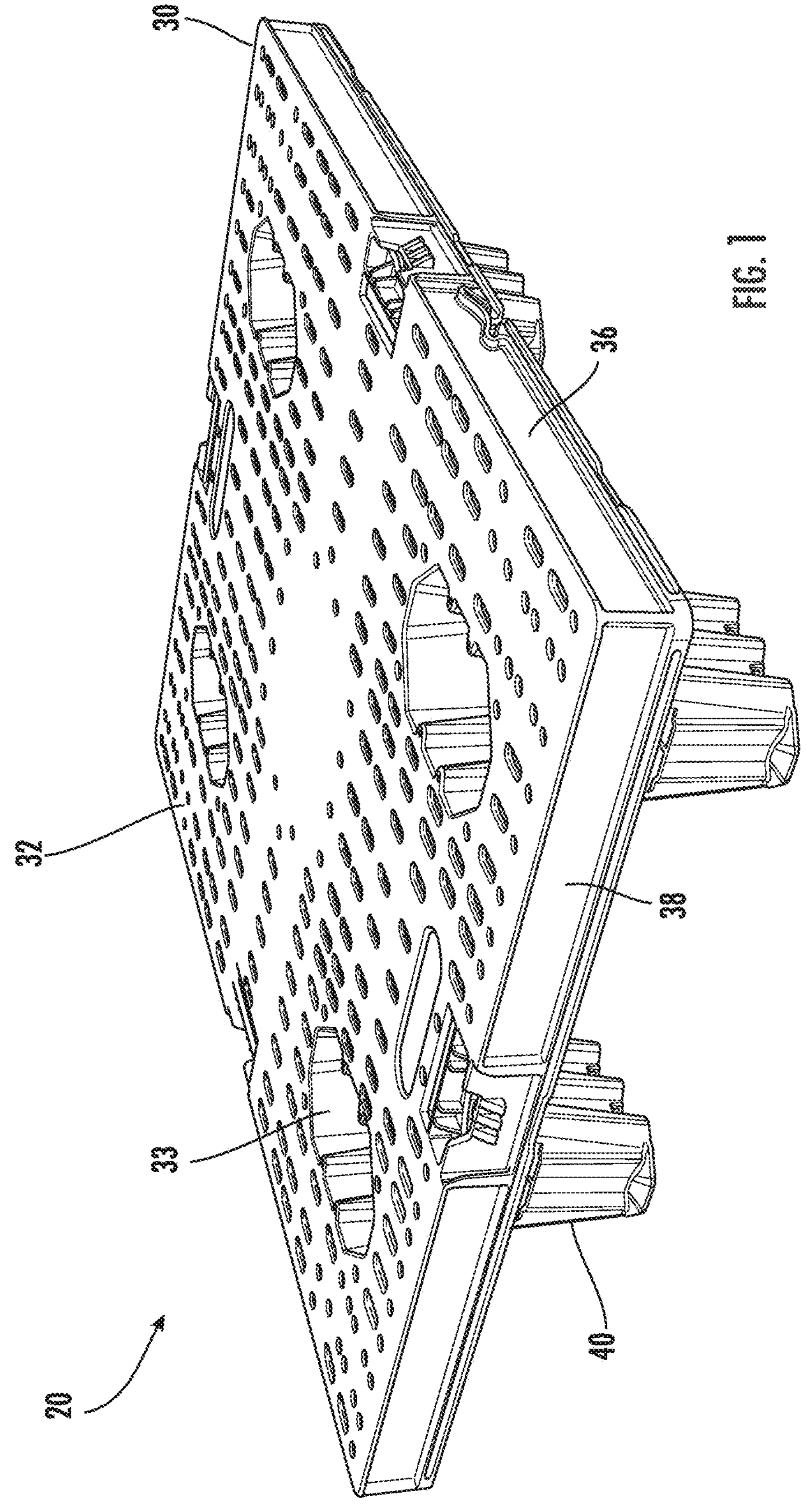
FIG. 1 is an upper perspective view of a quarter-size plastic platform in accordance with the disclosure.
Figure 2:
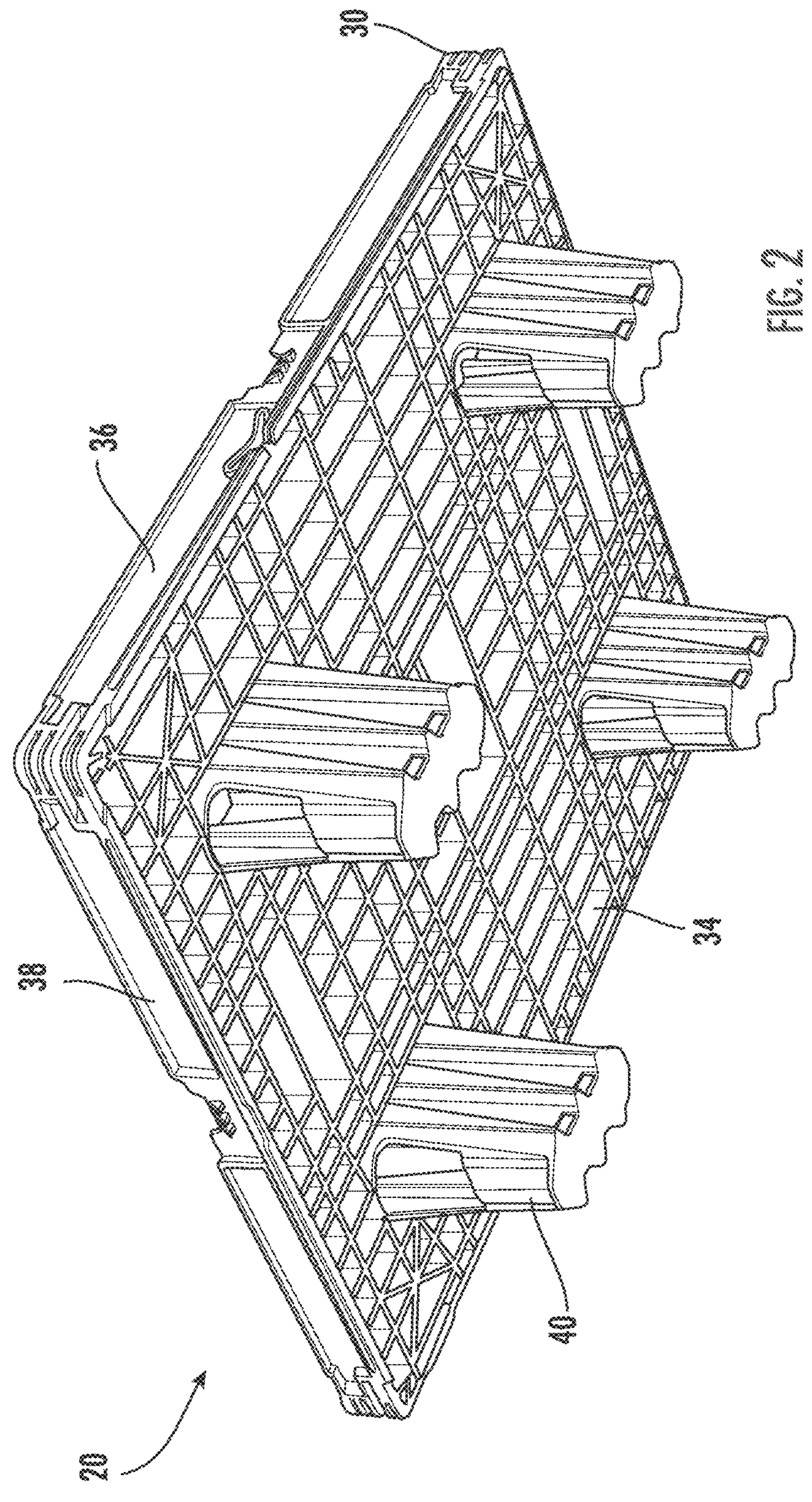
FIG. 2 is a lower perspective view of the quarter-size plastic platform shown in FIG. 1.

Referring initially to FIGS. 1 and 2, the illustrated plastic platform 20 includes a top deck 30 that has a plurality of spaced apart platform support leg openings 33 extending through upper and lower surfaces 32, 34 of the top deck 30. A plurality of platform support legs 40 extend from the lower surface 34 of the top deck and are aligned with the plurality of platform support leg openings 33. The platform support leg openings 33 are configured to receive a bottom surface of a platform support leg 40 from an identical platform 20 when stacked thereon.

The plastic platform 20 may also be referred to as a quarter-size plastic platform due to its size as compared to a full-size pallet. A full-size pallet is 48 inches by 40 inches, whereas the quarter-size plastic platform 20 is 24 inches by 20 inches. Using the metric system, the quarter-size plastic platform 20 corresponds to 60.96 cm by 50.8 cm. In some cases, platform is interchangeable with pallet.

The quarter-size plastic platform 20 is designed for retail merchandising and display configurations and provides a stable platform for a variety of display types. As will be discussed in detail below, the quarter-size plastic platform 20 includes product display attachment points. Since the quarter-size plastic platform 20 is intended to be placed on a retailer's floor space while displaying merchandise, the footprint of the quarter-size plastic platform 20 easily allows the retailer to position the plastic platforms 20 as needed within the aisles.

The upper surface 32 of the top deck 30 may be referred to as a product support surface, and the lower surface 34 may be referred to as an underside. The top deck 30 has outer exposed sides 36, 38 extending between the upper surface 32 and the lower surface 34. Outer sides 36 correspond to a length of the quarter-size plastic platform 20, and outer sides 38 correspond to a width or ends of the quarter-size plastic platform 20. The length is the longer dimension (i.e., 24 inches), with the width being the shorter dimension (i.e., 20 inches).

The platform support legs 40 are advantageously positioned on the lower surface 34 of the top deck 30 to support a load and to also enable two-way or four-way entry using multiple platform jack formats. Platform jack formats, for example, include a 27-inch forklift, a 21-inch hand jack, and electric platform jacks with 8 inch tines, 9 inch tines and 10 inch tines.

Figure 3:
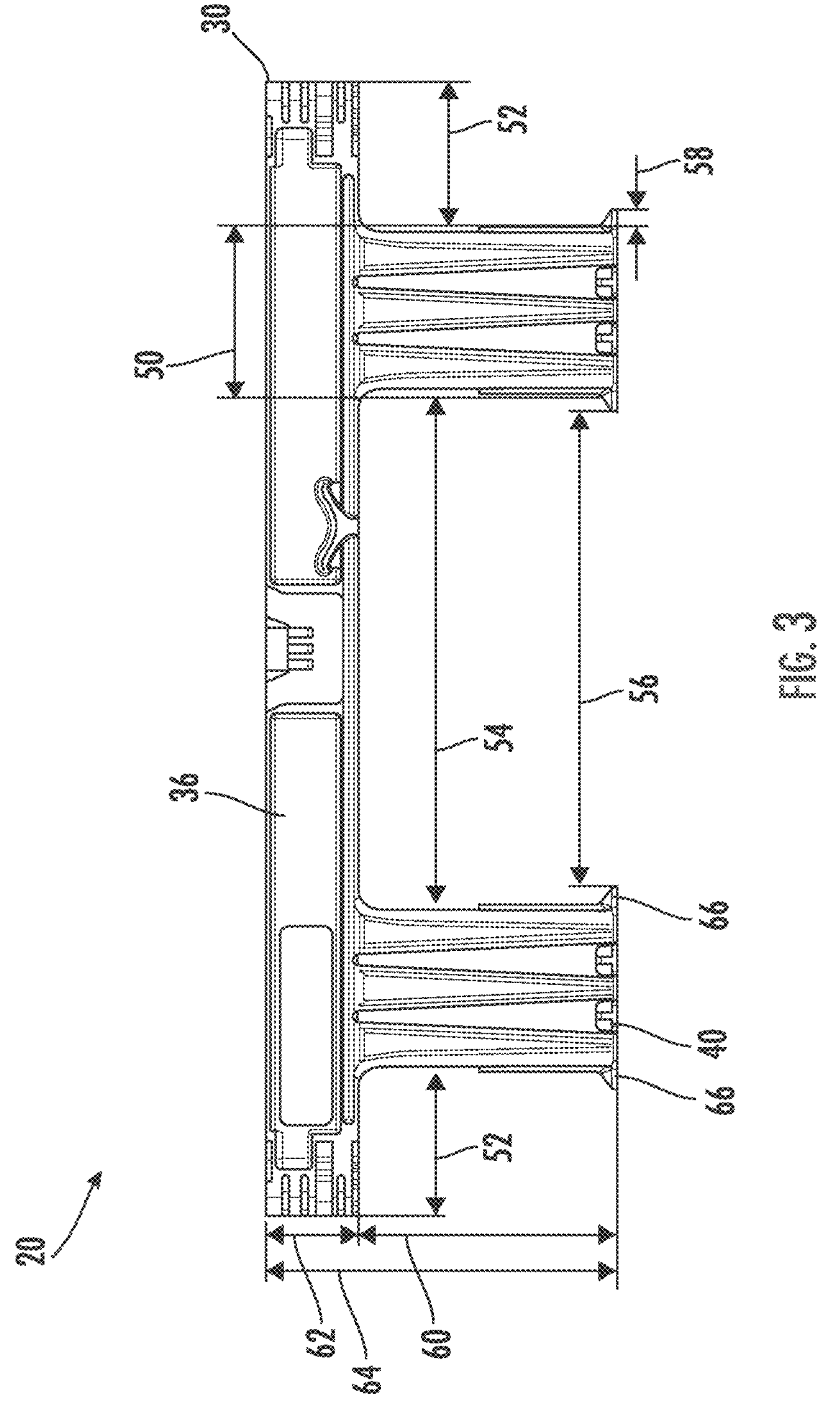
FIG. 3 is a side view with dimensions along a length of the quarter-size plastic platform shown in FIG. 1.

Dimensions and positioning of the platform support legs 40 will now be discussed. The dimensions are provided for illustrative purposes and are not to be limiting. A side view of the plastic platform 20 along a length 36 is provided in FIG. 3. Each platform support leg 40 in this view has a consistent or non-tapered width of 3.56 inches, as indicated by reference 50. Each platform support leg 40 is spaced 3.04 inches from the ends of top deck 30, as indicated by references 52. The distance between the platform support legs 40 is 10.71 inches, as indicated by reference 54.

Still referring to the side view of the plastic platform 20 along the length 36, a height of each platform support leg 40 is 4.06 inches, as indicated by reference 60. A height of the top deck 30 is 1.46 inches, as indicated by reference 62. An overall height of the plastic platform 20 is 5.51 inches, as indicated by reference 64.

Each platform support leg 40 includes a lip or extension 66. Each extension 66 extends 0.36 inches outwards from the width of the platform support leg 40 in this view, as indicated by reference 58. The distance between the extensions 66 on a pair of platform support legs 40 is 9.99 inches, as indicated by reference 56. The extensions 66 advantageously increase the surface area of a lower or bottom surface of each platform support leg 40, which allows the plastic platform 20 to work better when placed on conveyors having wide gaps between rollers.

Figure 4:
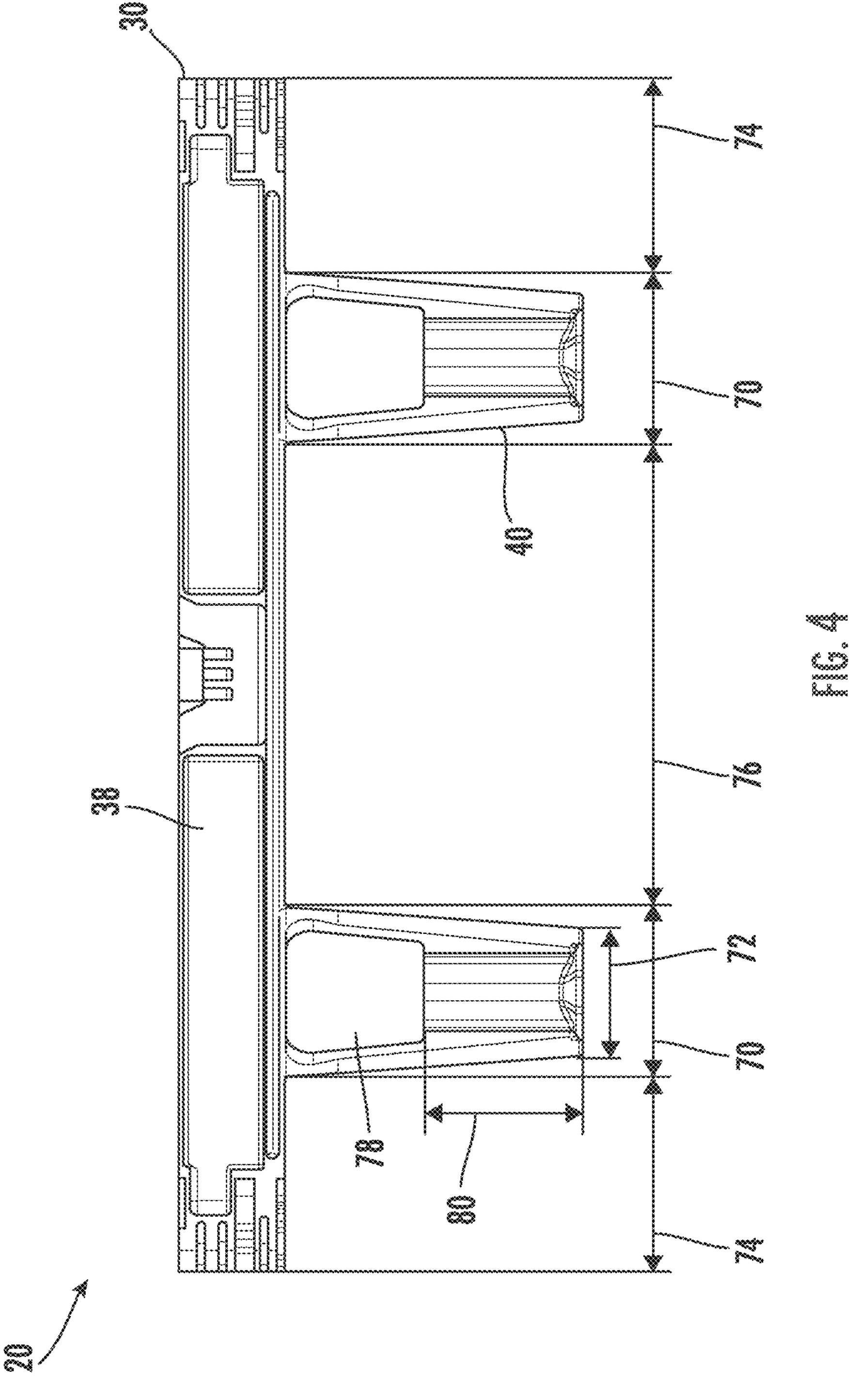
FIG. 4 is a side view with dimensions along a width of the quarter-size plastic platform shown in FIG. 1.

A side view of the plastic platform 20 along a width 38 is provided in FIG. 4. Each platform support leg 40 as shown in this view has a tapered width. The width of the platform support leg 40 extending from the top deck 30 starts off at 2.87 inches, as indicated by reference 70. The width of the platform support leg 40 then tapers to 2.15 inches, as indicated by reference 72. Each platform support leg 40 is spaced 3.25 inches from the sides of top deck 30, as indicated by references 74. The distance between the platform support legs 40 is 7.69 inches, as indicated by reference 76.

Figure 5:
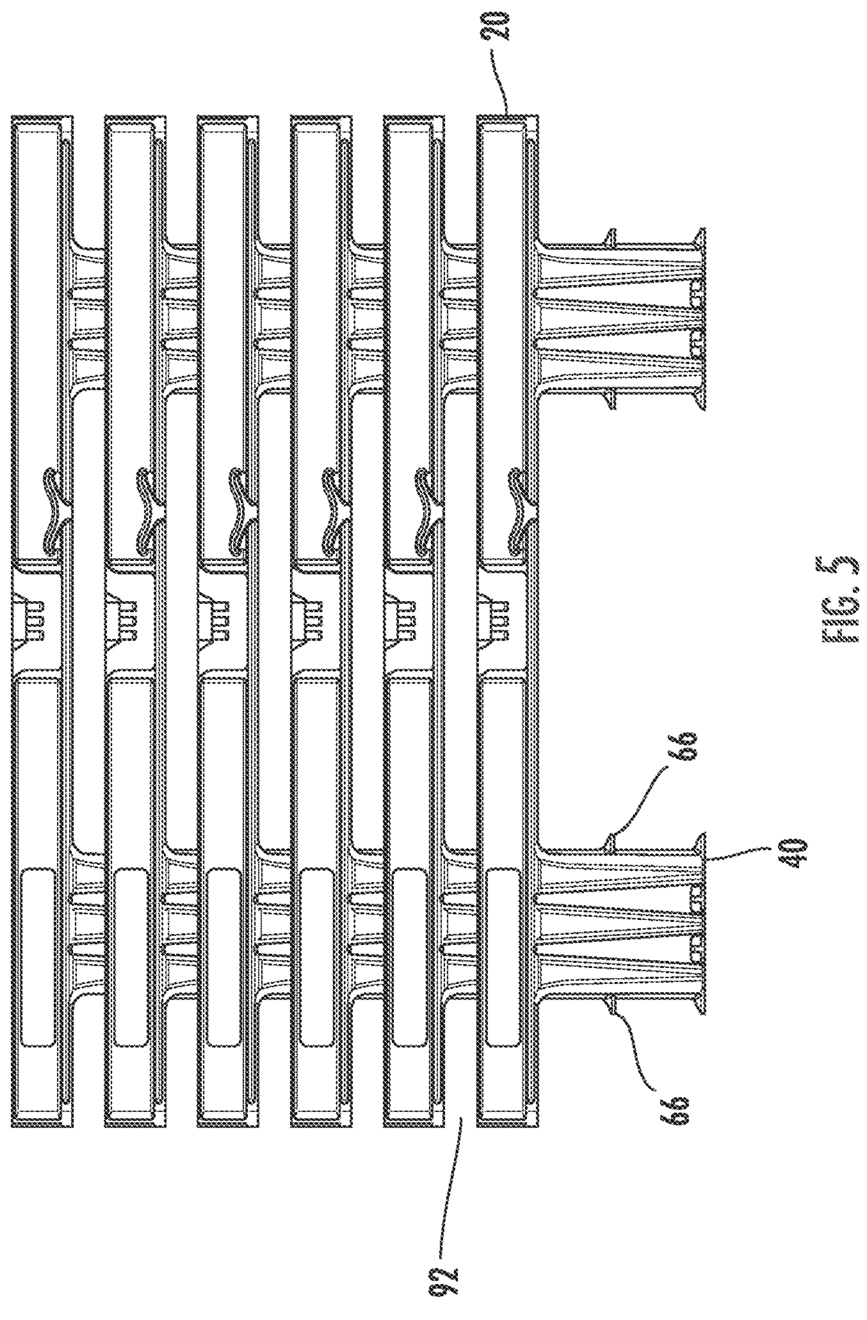
FIG. 5 is a side view with dimensions along a length of the quarter-size plastic platform shown in FIG. 1 stacked with other quarter-size plastic platforms.

Still referring to the side view of the plastic platform 20 along the end 38, each platform support leg 40 includes an opening 78. The opening 78 is 2.17 inches above the bottom surface of each platform support leg 40, as indicated by reference 80. The openings 78 are needed when the plastic platforms 20 are stacked one on top of another, as illustrated in FIG. 5.

Each opening 78 provides clearance for the extensions 66 on the bottom surface of a platform support leg 40 of an identical platform when stacked thereon. As illustrated, the extensions 66 extend outwards from the openings 78. As will be described in detail below, a lower surface of each opening 78 includes a shelf or support structure to support the lower surface of a respective platform support leg 40 of an identical platform when stacked thereon.

An advantage of the shelf or support structure supporting the lower surface of a respective platform support leg 40 is that this allows for a gap 92 to be provided between the top decks 30 of the stacked platforms 20. The gaps 92 allow a person's fingers to be positioned between the stacked plastic platforms 20 for the plastic platforms 20 to be more easily separated. Another advantage of the shelf or support structure is that the platform support legs 40 are partially wedged in place when stacked on an underlying plastic platform 20, which also makes it easier for stacked platforms 20 to be separated.

Referring now to FIGS. 6-9, the platform support legs 40 will now be discussed in greater detail. Each platform support leg 40 includes an upper portion 41 and a lower portion 43. The upper portion 41 is adjacent the lower surface 34 of the top deck 30 and has an opening 78 extending through a first pair of spaced apart sidewalls 110. The opening 78 is aligned with a respective one of the platform support leg openings 33 in the top deck 30.

The lower portion 43 is adjacent the upper portion and includes a shelf 90 that separates the opening 78 in the upper portion 41 from the lower portion 43. The shelf 90 is configured to provide support to a bottom surface 130 of a platform support leg 40 from an identical platform 20 when stacked thereon. The pair of extensions 66 extend outwards from the bottom surface 130 of the lower portion 43, with the opening 78 in the upper portion 41 providing clearance for the pair of extensions 66 on the platform support leg 40 of the identical platform 20 when stacked thereon.

The pair of extensions 66 on the lower portion 43 are aligned with the opening 78 in the upper portion 41 of each platform support leg 40. The pair of extensions 66 extend beyond a width of the opening 78 in the upper portion 41 of each platform support leg 40. Consequently, the pair of extensions 66 on the identical platform 20 when stacked thereon extend beyond the width of the opening 78 in the upper portion 41 of each platform support leg 40, as shown in FIG. 5.

The lower portion 43 of each platform support leg 40 includes a pair of spaced apart sidewalls aligned with the first pair of spaced apart sidewalls 110 in the upper portion 41, with both pairs of sidewalls 110 having a tapered width toward the pair of extensions 66.

The upper and lower portions 41, 43 of each platform support leg 40 include a second pair of spaced apart sidewalls 100, with both of the second pair of sidewalls 100 having a same width.

The shelf 90 is adjacent the upper portion 41 of each platform support leg 40, and an upper surface of the shelf 90 includes a ribbed structure. The ribbed structure is defined by a pair of spaced apart ribs 122 and a divider 124 intersecting the pair of ribs 122, as shown in FIG. 8.

Figure 8:
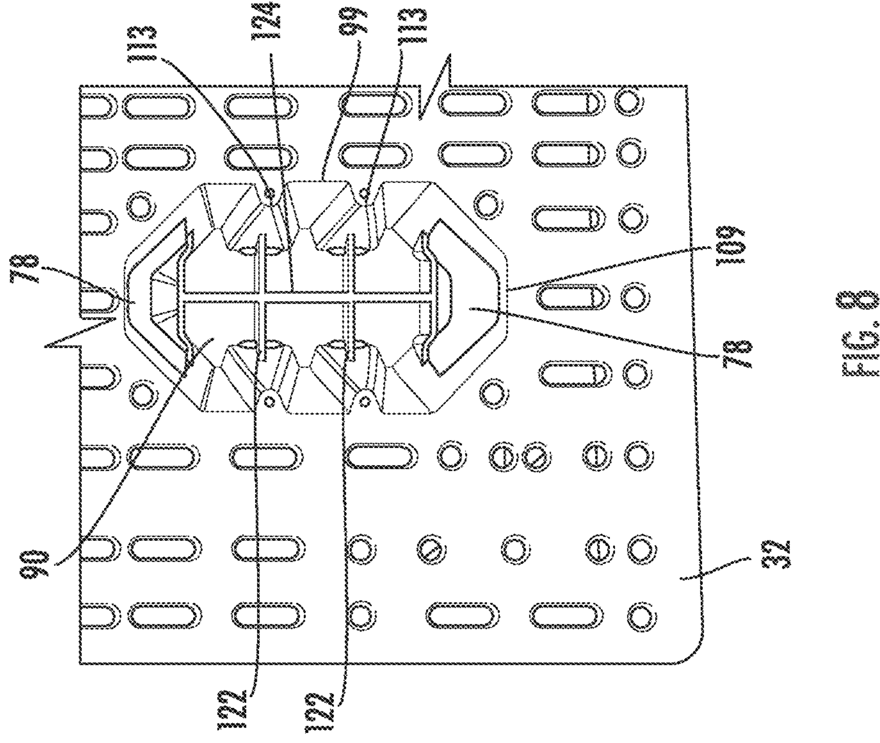
FIG. 8 is top view of one of the platform support legs of the plastic platform shown in FIG. 1.

Still referring to FIG. 8, each platform support leg opening 33 in the top deck 30 includes a first pair of spaced apart sidewalls 109 and a second pair of spaced apart sidewalls 99. The first pair of spaced apart sidewalls 109 are aligned with the first pair of spaced apart sidewalls 110 in the upper portion 41 of a corresponding platform support leg 40. The second pair of spaced apart sidewalls 99 are adjacent the first pair of spaced apart sidewalls 109 and are aligned with the second pair of spaced apart sidewalls 110 in the upper portion 41 of a corresponding platform support leg 40.

Each sidewall 99 includes spaced apart peaks 113 extending into the platform support leg opening 33. The peaks 113 function as guides for when the corresponding platform support leg 40 of the identical platform 20 is stacked thereon. Sidewalls 109 are spaced apart to allow clearance for the pair of extension 66 on the platform support leg 40 of the identical platform 20 when stacked thereon.

Figures 6, 7:
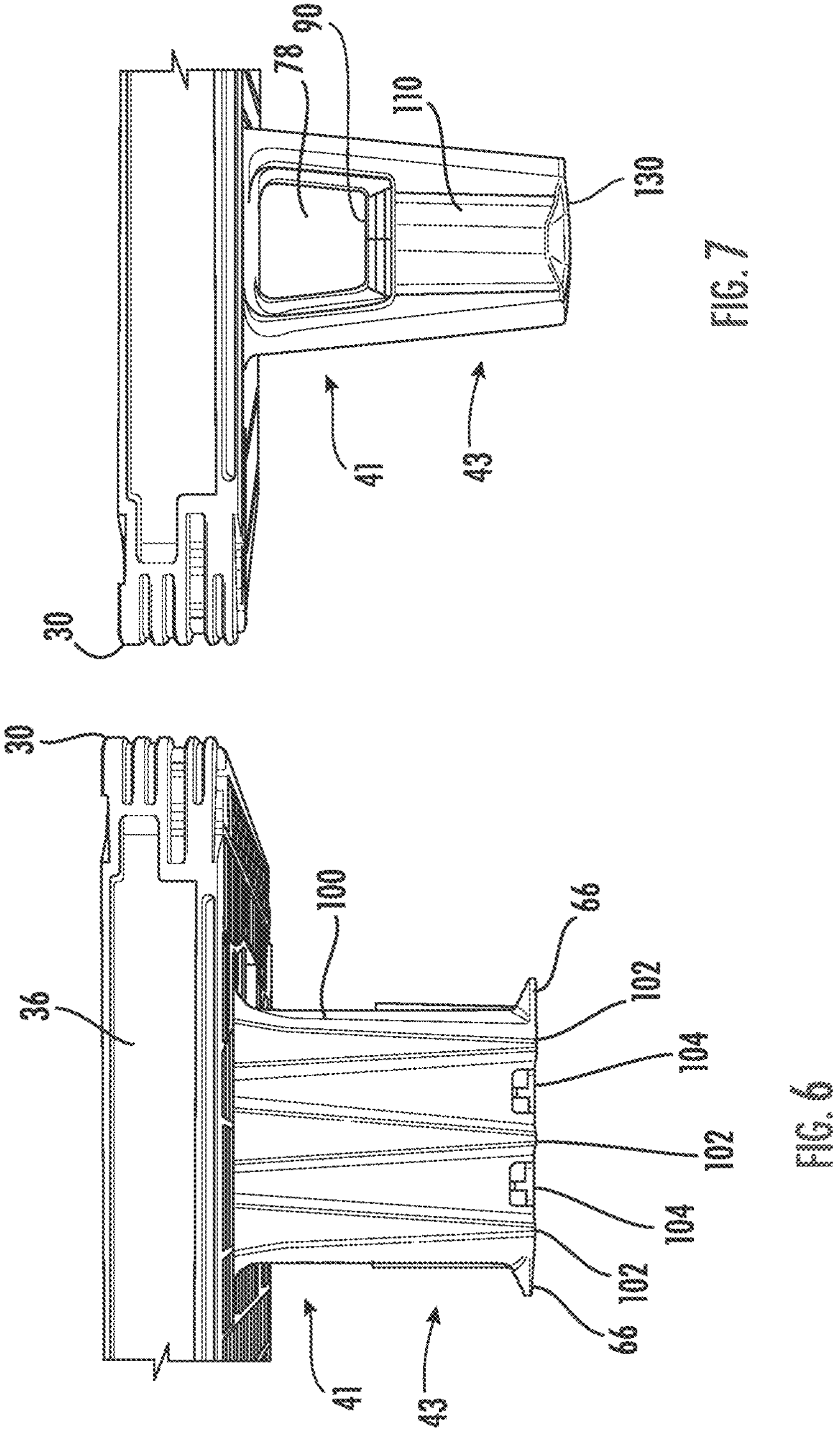
FIG. 6 is side view of a platform support leg along a length of the plastic platform shown in FIG. 1.
FIG. 7 is side view of a platform support leg along a width of the plastic platform shown in FIG. 1.
Figure 9:
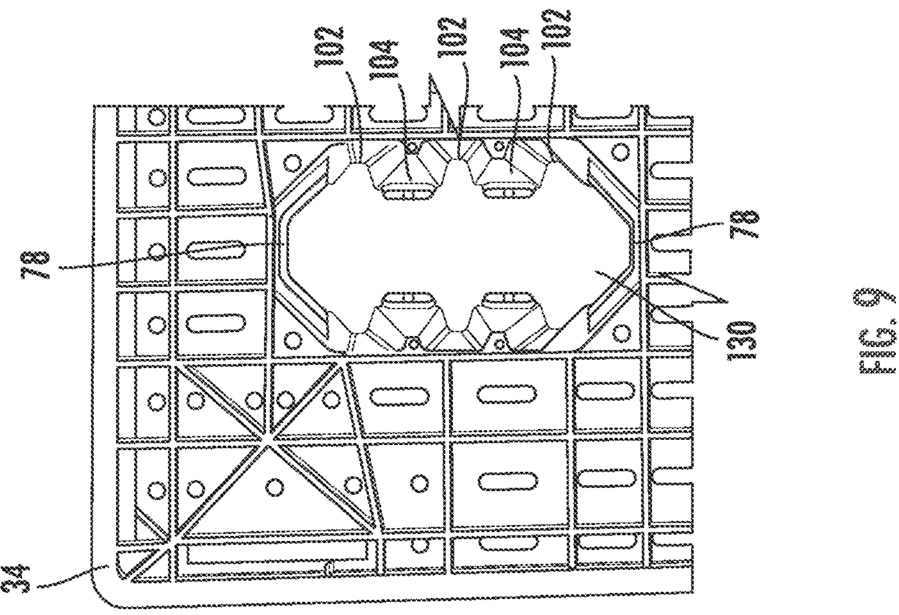
FIG. 9 is bottom view of one of the platform support legs of the plastic platform shown in FIG. 1.

The upper and lower portions 41, 43 of each platform support leg 40 include a second pair of spaced apart sidewalls 100 aligned with the second pair of spaced apart sidewalls 99 in the platform support leg opening 33. The second pair of sidewalls 100 include spaced apart peaks 102 extending outwards from the second pair of sidewalls 100, as shown in FIGS. 6 and 9.

The spaced apart peaks 102 are separated by valleys 104 and are staggered with respect to the pair of spaced apart peaks 113 in the platform support leg opening 33 to function as guides for when the corresponding platform support leg 40 of the identical platform 20 is stacked thereon. Also, the lower portion 43 of each platform support leg 40 includes drainage openings.

Other features of the plastic platform 20 will now be discussed in reference to FIGS. 10-13. These features include hand access holes, stretch wrap retention locations, banding retention guides, and product display attachment points.

Figure 10:
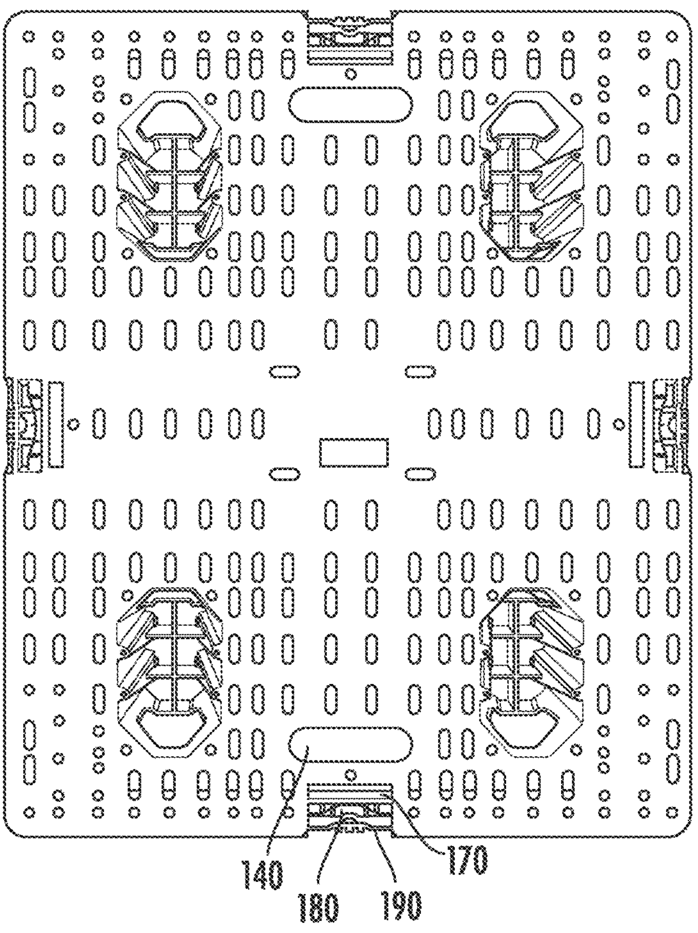
FIG. 10 is top view of the plastic platform shown in FIG. 1 with hand access holes and product display attachment points.

As illustrated in a top view of the top deck 30 in FIG. 10, a pair of hand access holes 140 are provided. The hand access holes 140 provide an easy means for an operator to handle the quarter-size plastic platform 20. Each hand access hole 140 is sized large enough for a user to insert all four fingers therethrough. By providing a hand access hole 140 near each end of the plastic platform 20, the quarter-size plastic platform 20 can very easily be grasped by the user for carrying it or for unloading it from a stack of platforms.

Figure 11:
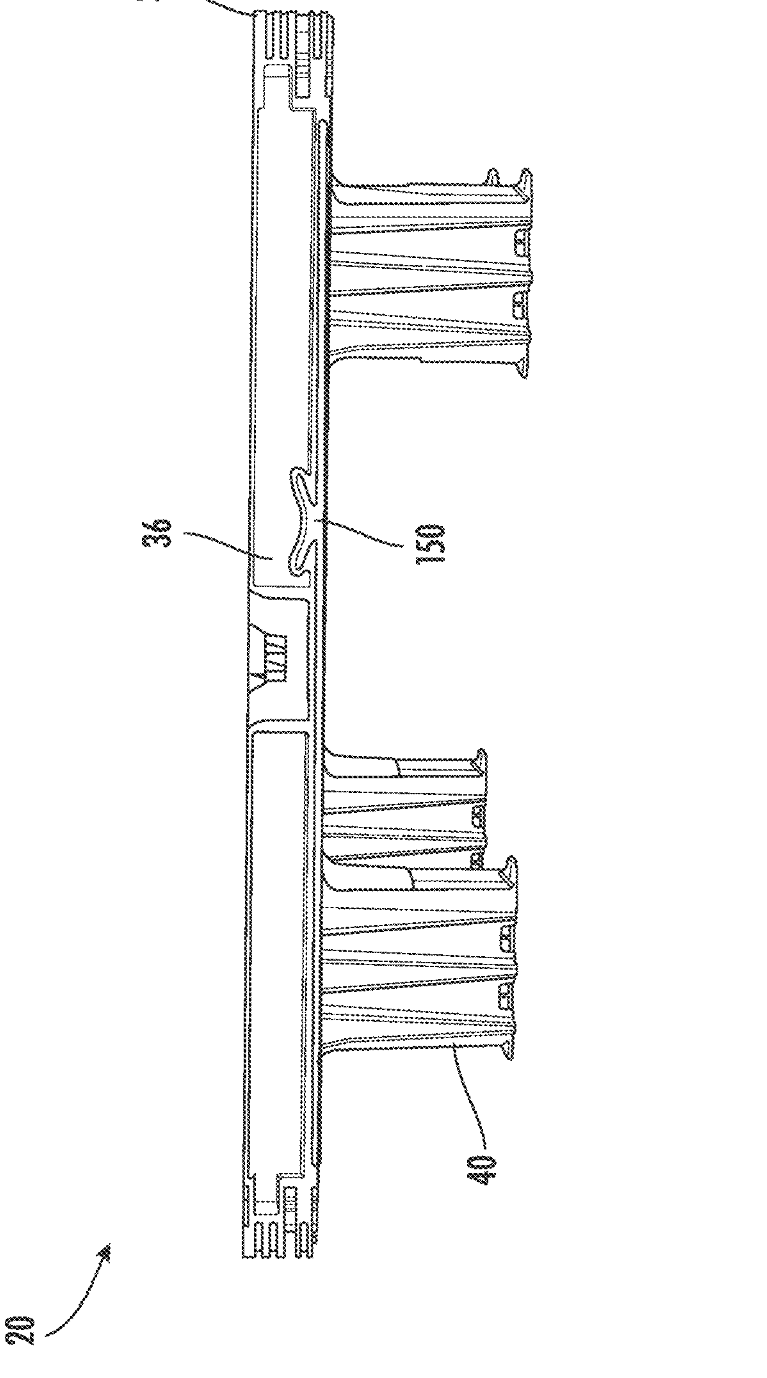
FIG. 11 is side view of the plastic platform shown in FIG. 1 with a shrink wrap retention location.

A shrink wrap retention location 150 is shown in the side view of the plastic platform 20 in FIG. 11. There is a respective shrink wrap retention location 150 on the length sides 36 of the plastic platform 20. The shrink wrap retention locations 150 are used in the application and retention of shrink wrap over a product being carried by the top deck 30. Shrink wrap is commonly used to secure a product to a platform. This is often an alternative to banding, although both can be applied if desired.

A problem encountered in applying shrink wrap to a platform is in securing the ends of the shrink wrap. This problem is encountered both at the start and the finish of shrink wrapping since the wrap might not want to adhere to the product or the platform or may fail to retain itself against the product of the platform at the end.

Each shrink wrap retention location 150 takes the form of a two-sided groove, similar to the shape of an anvil. The two-sided groove has a front recess and a rear recess and a narrowed opening there between. The narrowed opening allows the shrink wrap to be located into the groove but makes it harder for it to come out again. The wrap can be pulled into either the front or rear recesses and can secure an end of the wrap either at the start or at the end of the wrapping process.

The top deck 30 includes a number of different product display attachment points for securing a product display or box to the quarter-size plastic platform 20. When the quarter-size plastic platform 20 is on the floor within a store with products thereon, for example, a product display helps to promote the products. U.S. Pat. No. 9,387,953 discloses a fractional plastic pallet with product display attachment points and is incorporated herein by reference in its entirety. The '953 patent is assigned to the current assignee of the present invention.

Figure 12:
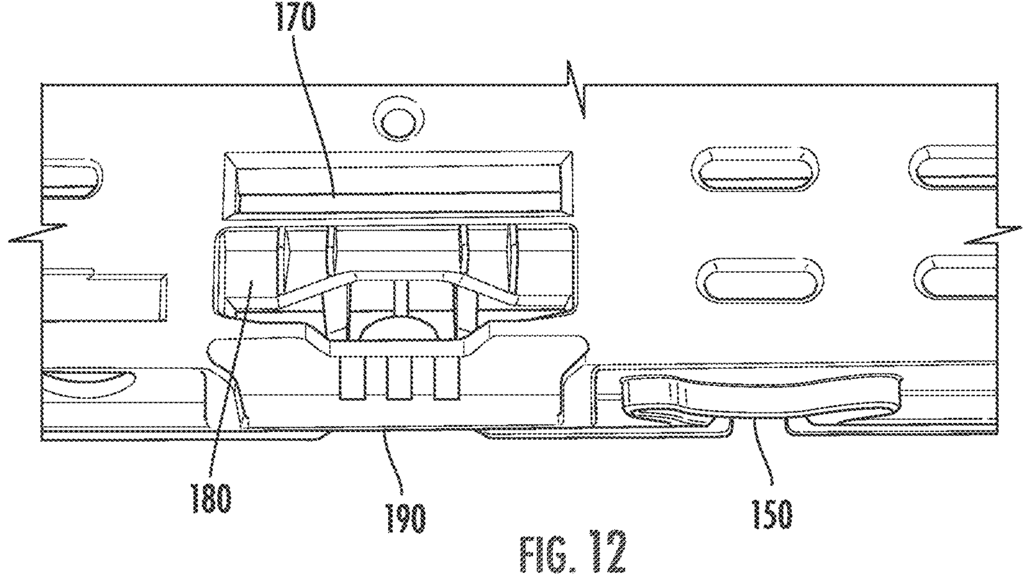
FIG. 12 is a perspective view of the product display attachment points on one side of the top deck shown in FIG. 10.
Figure 13:
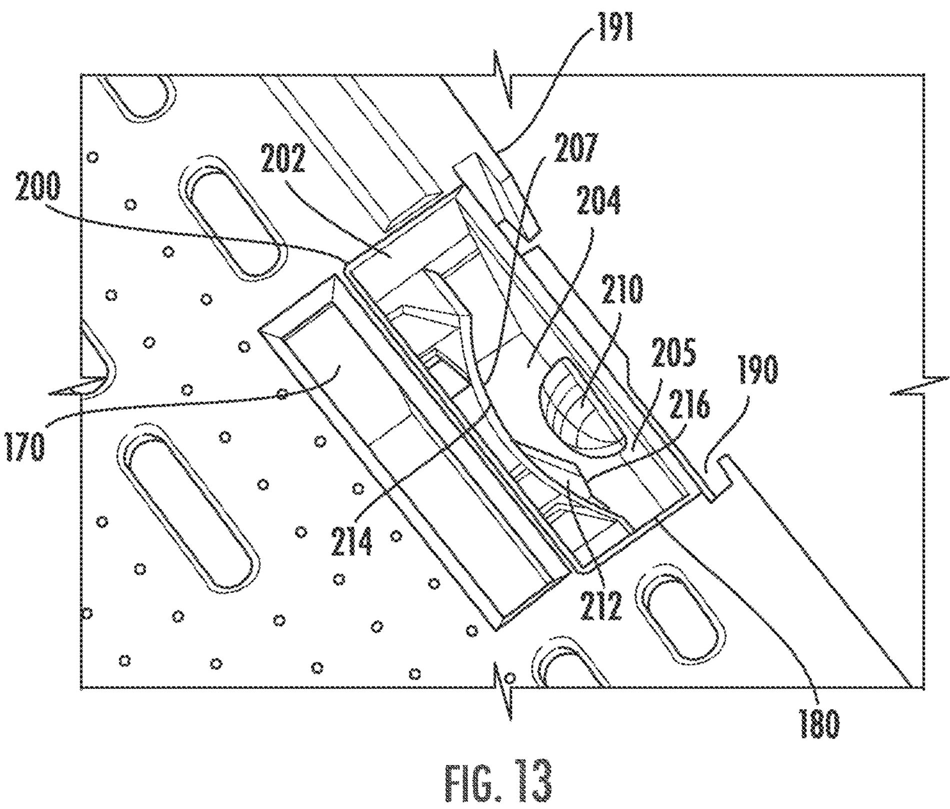
FIG. 13 is a more detailed perspective view of the product display attachment points shown in FIG. 12.

Product display attachment points include display attachment slots 170, 180 and 190 in the upper surface 32 of the top deck 30, as shown in FIGS. 10 and 12. Each display attachment slot 170, 180 and 190 is rectangular shaped and is sized to receive a tab descending from the base of a product display so as to allow the product display to be held in place on the platform 20.

A pair of display attachment slots 170 is located adjacent each side 36, 38 of the top deck 30, for a total of four. There are also four display attachment slots 180 and four display attachment slots 190 in the top deck 30. Each display attachment slot 180 is aligned with a respective display attachment slot 170, and each display attachment slot 190 is recessed from a side 36, 38 of the top deck 30 and aligned with a respective display attachment slot 180.

Still referring to FIGS. 10 and 12, each display attachment slot 180 includes an outer slot 200 within the top deck 30 and an inner slot 204 recessed within the outer slot. The outer slot 200 includes sides 202 and a partially closed bottom 214 forming a curved shelf. The inner slot 204 is adjacent the curved shelf 214 and is recessed below the outer slot 200. The inner slot 204 has a pair of spaced apart sidewalls 205 and 207, and a closed bottom 209.

Within the inner slot 204, sidewall 205 includes a projection 210 extending therefrom, and the opposing sidewall 207 includes a tapered member 216 extending therefrom. The tapered member 216 has a downwards taper towards the projection 210. If the product display tab has an appropriately positioned hole, that hole can engage and lock onto the projection 210 or the tapered member 216.

The sidewall 207 with the tapered member 216 is curved corresponding to the curved shelf 214, whereas the sidewall 205 with the projection 210 is not curved. The tapered member 216 includes a lowermost surface that is perpendicular to the closed bottom of the inner slot 204. There is a gap between the flat underside and the closed bottom. The projection 210 has a quarter-spherical shape, for example. The tapered member 216 is aligned with a center of the projection 210.

Each display attachment slot 190 is recessed from a side 36, 38 of the top deck 30. A significant portion of the corresponding sides 36, 38 of the top deck 30 is removed so as to expose the display attachment slot 190. Removal of the corresponding sides 36, 38 for the display attachment slots 190 is uniform so as to form a pair of spaced apart retention tabs 191 for securing a product display tab. The retention tabs 191 are at an upper portion of the display attachment slot 190, while the lower portion of the display attachment slot 190 is fully exposed.

In some embodiments, the plastic platform 20 includes computing components, such as a platform tracking device, that are incorporated within at least a portion of the plastic platform 20. The computing components and methods of using the computing components of the plastic platform 20 will now be discussed with reference to FIGS. 14-19.

Figure 14:
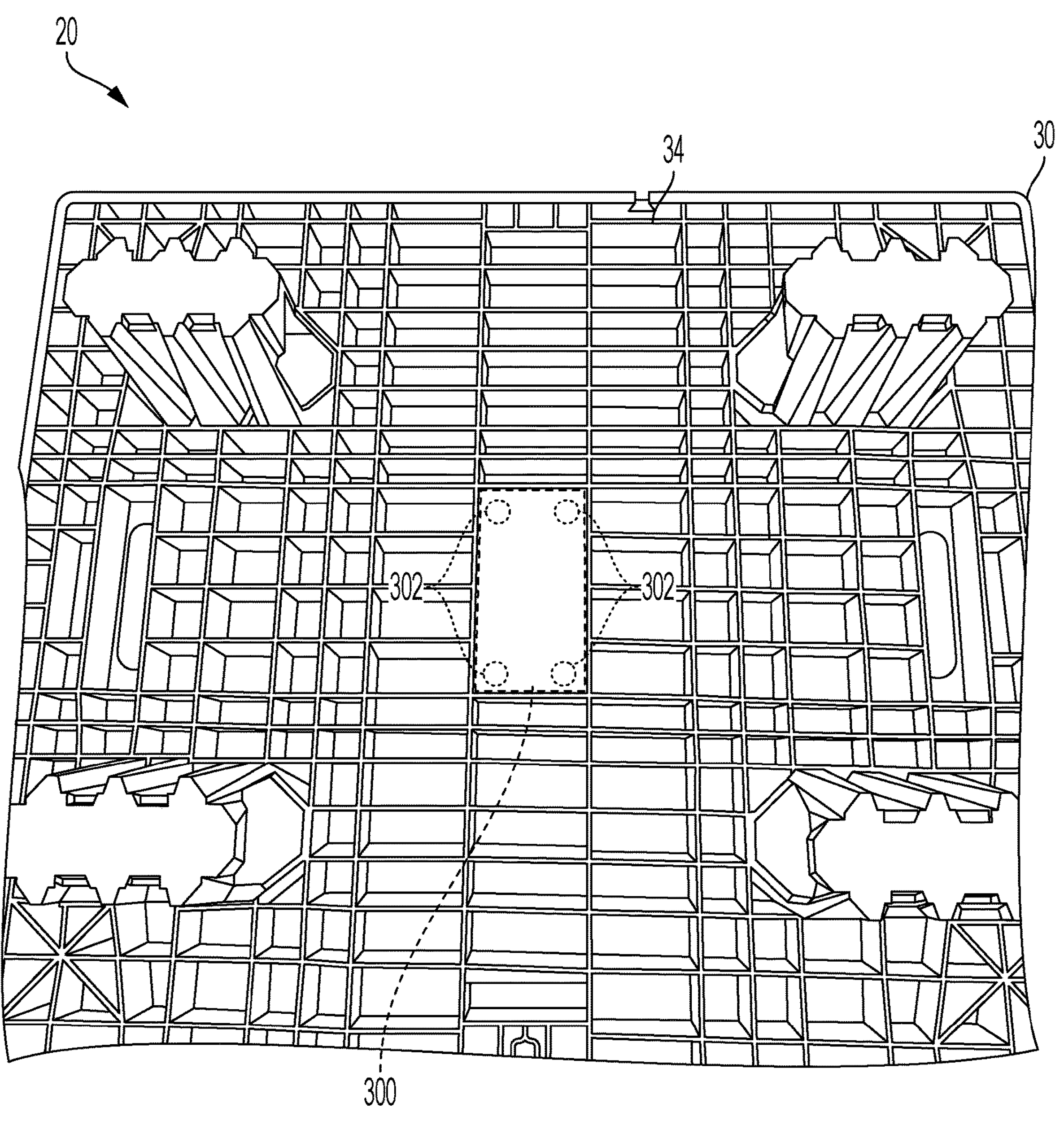
FIG. 14 is a bottom view of the quarter-size plastic platform shown in FIG. 1, further illustrating a platform tracking device incorporated thereon.

FIG. 14 is a bottom view of the quarter-size plastic platform shown in FIG. 1, further illustrating a platform tracking device incorporated thereon. As depicted, a platform tracking device 300 may be positioned on the lower surface 34 of the top deck 30 of the plastic platform 20.

In some embodiments, the platform tracking device 300 includes an exterior housing assembly that is positioned at least partially within the top deck 30 of the plastic platform 20. For instance, the top deck 30 may include one or more gaps extending a distance within the top deck 30 from the lower surface 34. In some examples, the one or more gaps may include a tracking device gap and the platform tracking device 300 may be positioned within the tracking device gap. In some examples, one or more dimensions of the tracking device gap may be based at least in part on the dimensions of the platform tracking device 300.

The platform tracking device 300, for example, may include an exterior housing assembly that defines a height, width, and depth of the platform tracking device 300. The exterior housing assembly may include any material, including a polycarbonate (PC), acrylonitrile butadiene styrene (ABS), and/or the like. In some examples, the tracking device gap may extend a distance within the top deck 30 that is greater than or equal to the depth of the exterior housing assembly, such that the platform tracking device 300 may sit flush with the lower surface 34 of the top deck 30.

In some examples, the platform tracking device 300 may be affixed to the plastic platform 20. For instance, the exterior housing assembly of the platform tracking device 300 may be mounted within the top deck 30 by one or more mounting screws 302. The mounting screws, for example, may include four M6 30 mm screws.

Figure 15:
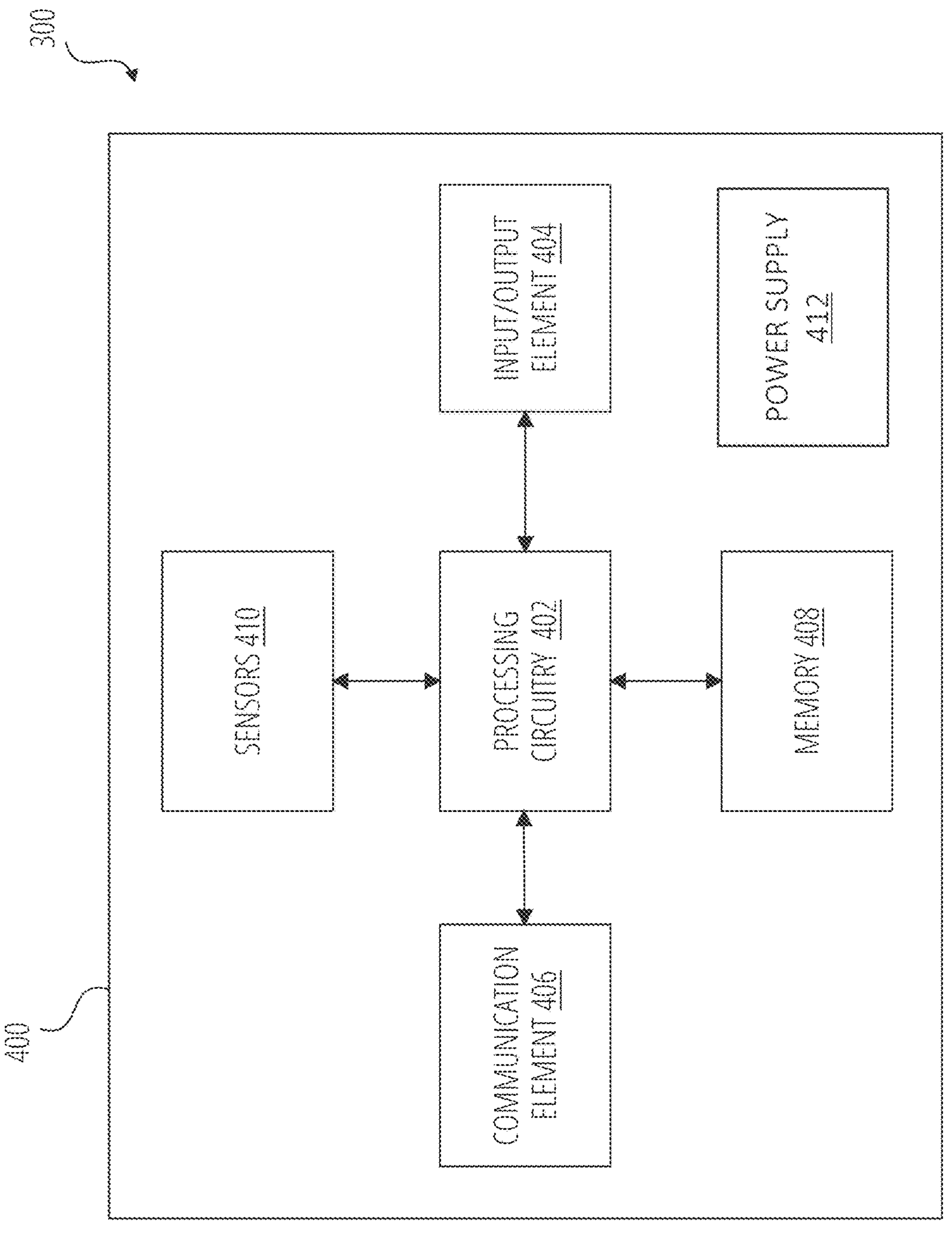
FIG. 15 is a schematic diagram depicting an example platform tracking device in accordance with one or more embodiments of the present disclosure.

FIG. 15 is a schematic diagram depicting an example platform tracking device 300 in accordance with one or more embodiments of the present disclosure. The platform tracking device 300 may include an exterior housing assembly 400 and a plurality of computing elements positioned and electrically connected within the exterior housing assembly 400 of the platform tracking device 300. As shown, the computing elements may include processing circuitry 402, a communication element 406, input/output element 404, memory 408, one or more sensors 410, and/or other components configured to perform various operations, procedures, functions or the like described herein. In some embodiments, the platform tracking device 300 can include a printed circuited board (PCB) with one or more connected devices.

In some embodiments, the exterior housing assembly 400 of the platform tracking device 300 encloses the encloses the processing circuitry 402, memory 408, sensors 410, communication element 406, and/or a power supply 412.

The processing circuitry 402 can be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 15 as a single box, in an embodiment, the processing circuitry 402 can include a plurality of processors and signal processing modules. The plurality of processors can be embodied on a single electronic device or can be distributed across a plurality of electronic devices collectively configured to function as the circuitry of the platform tracking device 300. The plurality of processors can be in operative communication with each other and can be collectively configured to perform one or more functionalities of the circuitry of the platform tracking device 300 as described herein. In an example embodiment, the processing circuitry 402 can be configured to execute instructions stored in the memory 408 or otherwise accessible to the processing circuitry 402. These instructions, when executed by the processing circuitry 402, can cause the circuitry of the platform tracking device 300 to perform one or more of the functionalities, as described herein.

Whether configured by hardware, firmware/software methods, or by a combination thereof, the processing circuitry 402 can include an entity capable of performing operations according to embodiments of the present disclosure while configured accordingly. Thus, for example, when the processing circuitry 402 is embodied as an ASIC, FPGA or the like, the processing circuitry 402 can include specifically configured hardware for conducting one or more operations described herein. Additionally, or alternatively, when the processing circuitry 402 is embodied as an executor of instructions, such as can be stored in the memory 408, the instructions can specifically configure the processing circuitry 402 to perform one or more algorithms and operations described herein.

Thus, the processing circuitry 402 used herein can refer to a programmable microprocessor, microcomputer or multiple processor chip or chips that can be configured by software instructions (applications) to perform a variety of functions, including the functions of the various embodiments described above. In some devices, multiple processors can be provided dedicated to wireless communication functions and one processor dedicated to running other applications. Software applications can be stored in the internal memory before they are accessed and loaded into the processors. The processors can include internal memory sufficient to store the application software instructions. In many devices, the internal memory can be a volatile or nonvolatile memory, such as flash memory, or a combination thereof. The memory can also be located internal to another computing resource (e.g., enabling computer readable instructions to be downloaded over the Internet or another wired or wireless connection).

The memory 408 can include suitable logic, circuitry, and/or interfaces that are adapted to store a set of instructions that is executable by the processing circuitry 402 to perform predetermined operations. Additionally, or alternately, the memory 408 can be configured to store data/information, application programs, instructions, etc., so that the platform tracking device 300 can execute various functions according to the embodiments of the present disclosure. For example, in at least some embodiments, the memory 408 is configured to cache input data for processing by the processing circuitry 402 and/or output data received by sensors 410. Thus, in at least some embodiments, the memory 408 is configured to store program instructions for execution by the processing circuitry 402. The memory 408 can store information in the form of static and/or dynamic information. When the functions are executed, the stored information can be stored and/or used by the platform tracking device 300. Example memory embodiments can include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 408 can be integrated with the processing circuitry 402 on a single chip, without departing from the scope of the disclosure.

In some embodiments, the memory 408 may be configured for offline logging of sensor data for a predetermined time period. For example, the sensor data may be locally stored for a configurable time period (e.g., six months, etc.). In some examples, the sensor data may be locally stored in response to one or more preconditions, such as a lack of network connectivity to a remote system.

The communication element 406 can be implemented as any apparatus included in a circuit, hardware, a computer program product, or a combination thereof, which is configured to receive and/or transmit data from/to another component or apparatus. The computer program product comprises computer-readable program instructions stored on a computer-readable medium (for example, the memory 408) and executed by a processing component (for example, the processing circuitry 402). In some embodiments, the communication element 406 (as with other components discussed herein) can be at least partially implemented as the processing circuitry 402 or otherwise controlled by the processing circuitry 402. In this regard, the communication element 406 can communicate with the processing circuitry 402, for example, through a bus. The communication element 406 can comprise, for example, antennas, transmitters, receivers, transceivers, network interface cards and/or supporting hardware and/or firmware/software and is used for establishing communication with another apparatus. The communication element 406 can be configured to receive and/or transmit any data that can be stored by the memory 408 by using any protocol that can be used for communication between apparatuses. The communication element 406 can additionally or alternatively communicate with the memory 408, the input/output element 404 and/or any other component of the processing circuitry, for example, through a bus.

In some embodiments, the communication element 406 includes a wireless communication interface configured to support one or more wireless communication protocols. For example, the communication element 406 may include an RF transmitter and an RF received configured to operate according to a wireless data transfer standard. The wireless data transfer standard may include any type or low energy and/or high energy standard, including a CAT-M standard, an NB-IoT standard, a Wi-Fi standard, or a BLE standard, and/or the like. By way of examples, the communication element 406 may include a cellular, surface mounted device antenna with −2 dBm gain, a BLE and/or Wi-Fi CHIP antenna with 3.5 dBi gain, and/or the like.

In some embodiments, the platform tracking device 300 can comprise an input/output element 404. The input/output element 404 can communicate with the processing circuitry 402 to receive instructions input by the user and/or to provide audible, visual, mechanical, or other outputs to the user. Therefore, the input/output element 404 can comprise supporting devices, such as a keyboard, a mouse, a display, a touch screen display, and/or other input/output mechanisms. Alternatively, at least some aspects of the input/output element 404 can be implemented on a device used by the user to communicate with the platform tracking device 300. The input/output element 404 can communicate with the memory 408, the communication element 406 and/or any other component, for example, through a bus. One or a plurality of input/output modules and/or other components can be included in the platform tracking device 300.

In some embodiments, the input/output element 404 includes one or more visual indicators (e.g., light emitting diodes (LEDs), etc.). The visual indicators, for example, may include status LEDs, such as a green LED representing a powered-on status of the platform tracking device 300, a red LED representing a powered-off status of the platform tracking device 300, a flashing red LED for device failure, a flashing blue LED during a firmware upgrade, and/or the like. In some embodiments, the visual indicators are positioned on an exterior surface of the exterior housing assembly 400.

In some embodiments, the input/output element 404 includes one or more push buttons. In some examples, the input/output element 404 may include a single push button that may trigger different actions if held for one or more time periods. For instance, a single tap of the push button may power on the platform tracking device 300. A hold of the push button for 5 seconds may power off the platform tracking device 300. A hold of 10 seconds may clear battery counters. In some embodiments, the one or more push buttons are positioned within the exterior housing assembly 400.

In some embodiments, the platform tracking device 300 includes a power supply 412. The power supply 412 may include a replaceable and/or rechargeable power supply. In some examples, the power supply 412 includes a battery carriage and one or more batteries. The one or more batteries may include any type of battery, such as twelve AA batteries of four cells. The power supply 412 may provide a five-year battery life for Cat M and/or NB networks and/or two years of battery life 2G networks.

In some embodiments, the platform tracking device 300 includes one or more configurable sensors 410. The one or more sensors 410, for example, may include one or more standalone hardware components, such as one or more temperature sensors (e.g., a resolution: 0.1° C., accuracy: ±1.5° C., range: −40 to +125° C., etc.), one or more accelerometers (e.g., 3-axis, ±16 G, etc.), one or more magnetometers (e.g., 3-axis, ±50 Gauss, etc.), and/or the like.

In addition, or alternatively, the one or more sensors 410 may include logic that is configured to generate sensor data using the processing circuitry 402, memory 408, and communication elements 406 of the platform tracking device 300. For example, the sensors 410 may include a location tracking component. The location tracking component may include a GNSS, such as a GPS, a GLObalnaya NAvigatsionnaya Sputnikovaya Sistema (GLONASS), a Galileo system, a BeiDou system, and/or the like. In addition, or alternatively, the location tracking component may include a network triangulation system configured to determine location data based at least in part on Cell ID-Triangulation based at least in part on CAT-M/NB-IoT cell information and/or Triangulation using 2G when NB-IoT is not available. In some examples, the location tracking component may include a Wi-Fi Triangulation system configured to generate location data based at least in part on MAC IDs. In addition, or alternatively, the location tracking component may include a BLE Beacon sniffing system.

Figure 16:
FIG. 16 a schematic diagram depicting a platform tracking ecosystem in accordance with various embodiments of the present disclosure.
Figure 16:
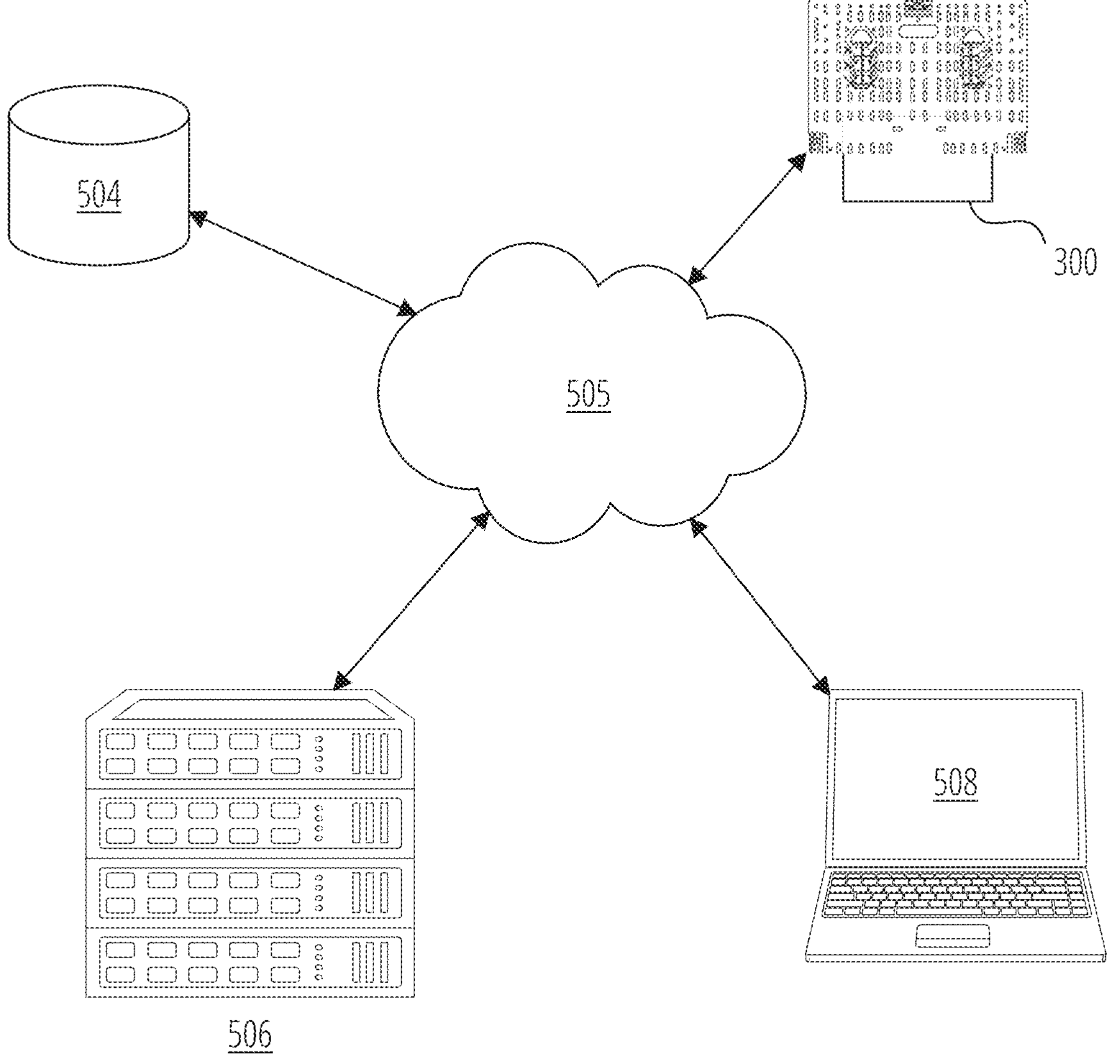

FIG. 16 a schematic diagram depicting a platform tracking ecosystem 500 in accordance with various embodiments of the present disclosure. As depicted, the platform tracking ecosystem 500 includes a platform with a platform tracking device 300, one or more computing entities 506 (e.g., servers), one or more databases 504, one or more networks 505, one or more user computing entities 508, and/or the like. In various examples, the platform tracking ecosystem 500 can operate to track various aspects of a platform, as described herein.

In various embodiments, the platform can be configured to transport and/or hold (e.g., for display, etc.) products within and/or across various locations and/or environments. In some embodiments, the platform tracking ecosystem 500 includes one or more platform tracking devices 300, the one or more computing entities 506, one or more databases 504, and/or the one or more user computing entities 508 that are in electronic communication with each other over the one or more networks 505 such that they can exchange data (e.g., receive and transmit data) with one another (e.g., periodically and/or in response to requests). Each of the components of the platform tracking ecosystem 500 can be in communication with one another over the same or different wireless or wired networks 505 including, for example, a wired or wireless Personal Area Network (PAN), Local Area Network (LAN), Metropolitan Area Network (MAN), Wide Area Network (WAN), cellular network, and/or the like. While FIG. 16 illustrates certain system components as separate, standalone devices, the various embodiments are not limited to this particular architecture.

As depicted in FIG. 16, the platform tracking ecosystem 500 includes one or more computing entities 506. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 506 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 506 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 506 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 506 with the assistance of the processing element and the operating system.

As indicated, in one embodiment, the computing entity 506 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 506 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 506 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 506 components can be located remotely from other computing entity 506 components, such as in a distributed system. Furthermore, one or more of the components can be aggregated and additional components performing functions described herein can be included in the computing entity 506. Thus, the computing entity 506 can be adapted to accommodate a variety of needs and circumstances, such as including various components described with regard to a mobile application executing on the user computing entity 508, including various input/output interfaces (e.g., a platform tracking interface, etc.).

As depicted in FIG. 16, the platform tracking ecosystem 500 includes a user computing entity 508. In various embodiments, the user computing entity 508 can be or include one or more mobile devices, wearable computing devices, and/or the like. An example user computing entity 508 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 508, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 508 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 508 can be capable of operating with one or more air interface standards, communication protocols, modulation types, and access types. More particularly, the user computing entity 508 can operate in accordance with any of a number of wireless communication standards and protocols. In a particular embodiment, the user computing entity 508 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 508 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 508 can also download changes, add-ons, and updates, for instance, to its firmware, software (e.g., including executable instructions, applications, program modules), and operating system.

According to one embodiment, the user computing entity 508 can include location determining aspects, devices, modules, functionalities, and/or similar words used herein interchangeably to acquire location information/data regularly, continuously, or in response to certain triggers.

The user computing entity 508 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 508 to cause display or audible presentation of information/data and for user interaction therewith via one or more user input interfaces. Moreover, the user interface can include or be in communication with any of a number of devices allowing the user computing entity 508 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 508 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 508 can capture, collect, store information/data, user interaction/input, and/or the like.

The user computing entity 508 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 508.

As depicted in FIG. 16, any two or more of the illustrative components of the platform tracking ecosystem 500 of FIG. 16 can be configured to communicate with one another via one or more networks 505. The networks 505 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 505 can have any suitable communication range associated therewith and can include, for example, global networks (e.g., the Internet), MANs, WANs, LANs, or PANs. In addition, the networks 505 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 16 provides an example platform tracking ecosystem 500, it is noted that the scope of the present disclosure is not limited to the example shown in FIG. 16. In some examples, the platform tracking ecosystem 500 can include one or more additional and/or alternative elements, and/or can be different from that illustrated in FIG. 16.

Figure 17:
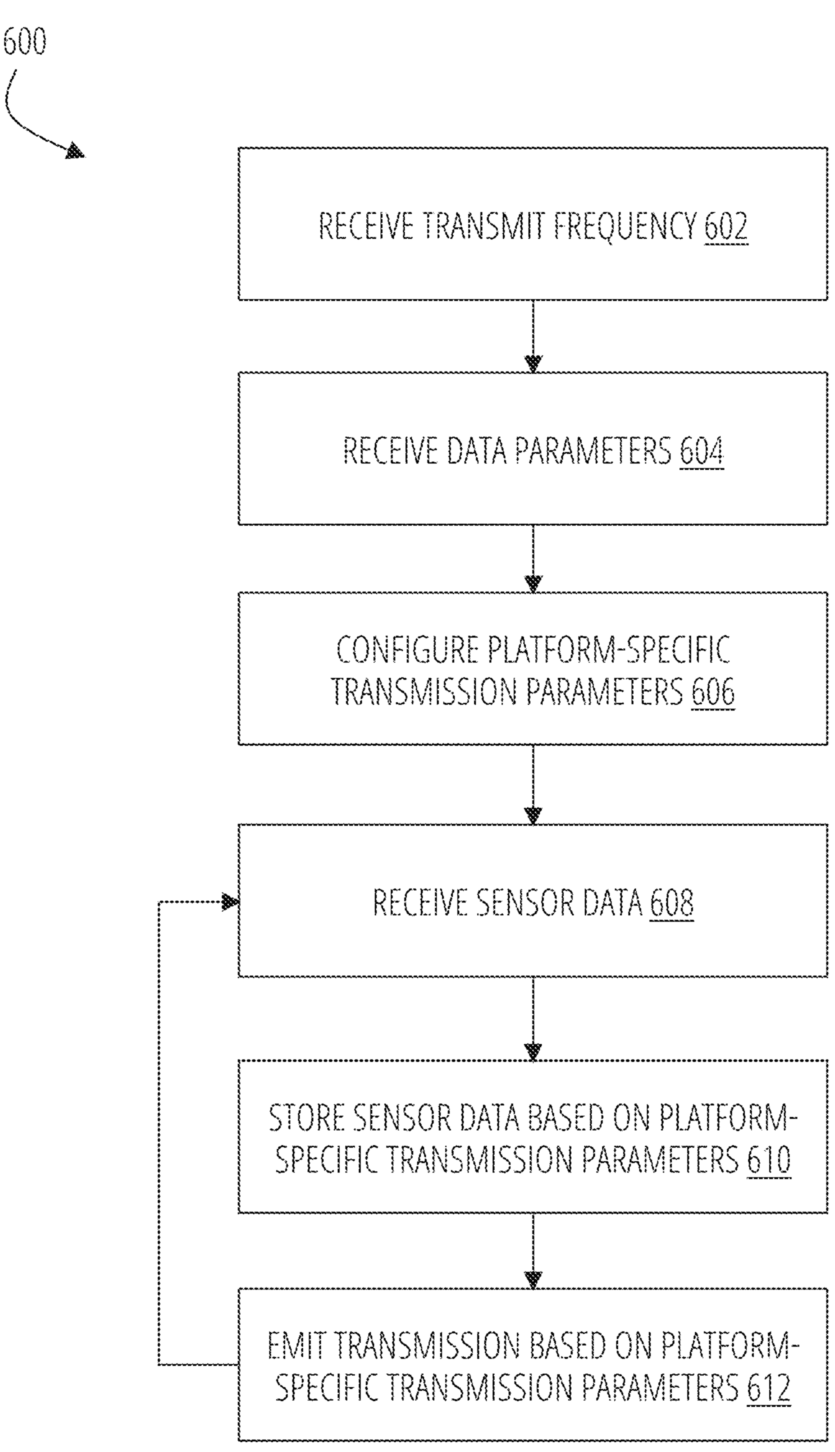
FIG. 17 is a flowchart diagram illustrating an example process in accordance with various embodiments of the present disclosure.

FIG. 17 is a flowchart diagram illustrating an example process 600 in accordance with various embodiments of the present disclosure. The flowchart depicts a platform-specific tracking process 600 for improving the tracking capabilities of platforms and products placed thereon. The process 600 may be implemented by one or more computing devices, entities, and/or systems described herein. For example, via the various steps/operations of the process 600, the platform tracking device 300 may leverage improved tracking capabilities to generate sensor data tailored to one or more user-defined constraints. By doing so, the process 600 enables platform-specific tracking operations that may selectively track more or less attributes of a platform's environment based at least in part on the circumstances. Ultimately, this allows for the conservation of computing resources, including local memory and power supplies (e.g., which increase or decrease with an amount and/or frequency of data requested), while providing enhanced tracking capabilities depending on the circumstances.

FIG. 17 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, receiving a transmit frequency. For example, the platform tracking device 300 may receive a transmit frequency identifying a period of time between one or more radio transmissions by the platform tracking device. The transmit frequency may be include a user defined frequency. For instance, a user may receive access to a platform tracking interface to configure one or more device operation rules, such as a logging frequency and/or a ping transmit frequency, for the platform tracking device 300.

Figure 19:
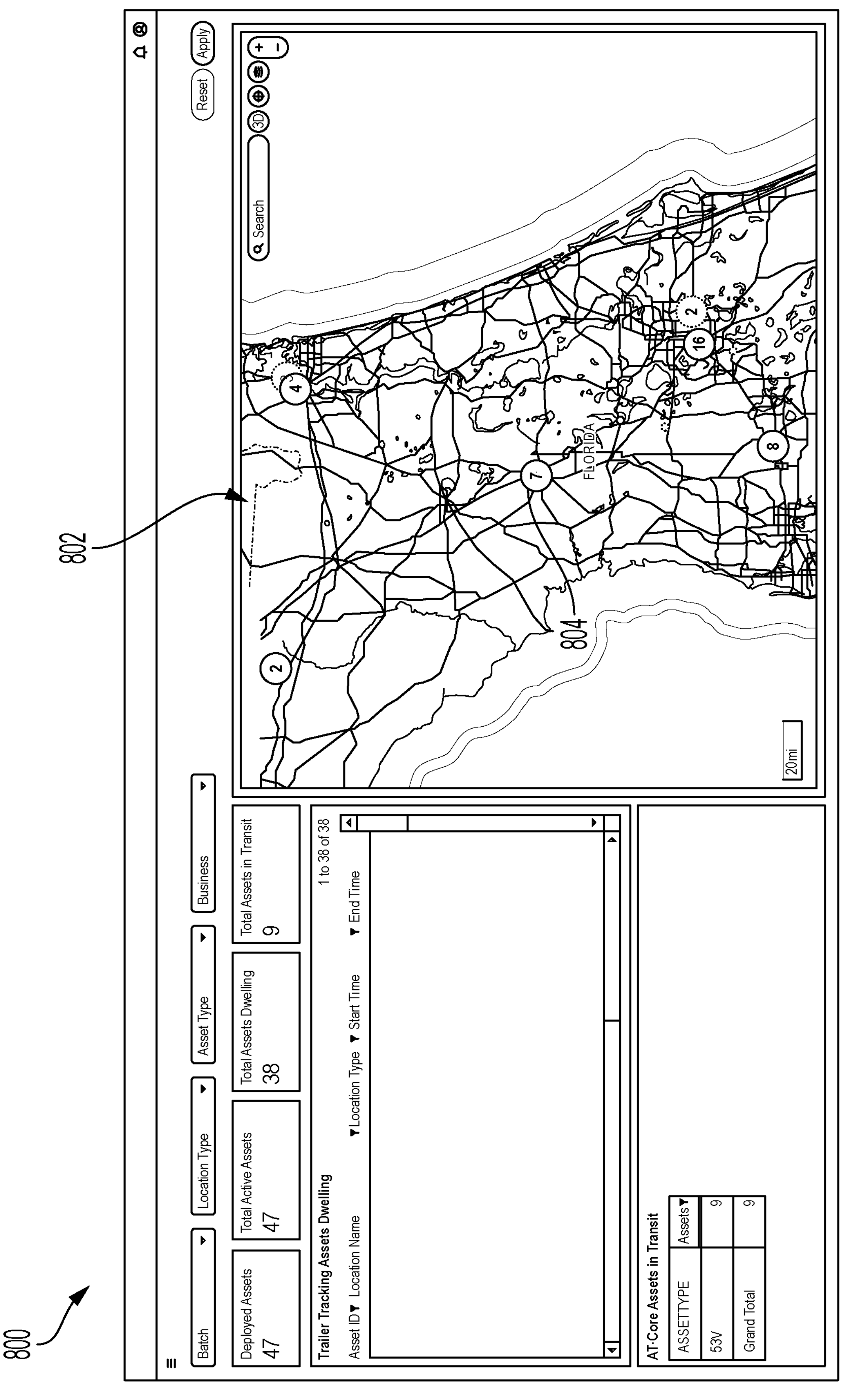
FIG. 19 is an operational example of a platform tracking interface in accordance with various embodiments of the present disclosure.

In some examples, the transmit frequency may be configured through a platform tracking interface, as described herein with reference FIG. 19. In some examples, a transmit frequency may define any period of time between a fiveminute interval to a twenty-four-hour interval. In some examples, a transmit frequency may be the same as a log interval. In addition, or alternatively, a log interval may be received that is different than the transmit frequency. A log interval, for example, may include a defined period of time between one minute and twenty-four hours. In some examples, a transmit frequency may include an active frequency (e.g., between 5 minutes and 24 hours, etc.) and a dormant frequency with a time period that is longer than the active frequency. A dormant frequency, for example, may define a seventy-two-hour time period without a log interval.

In some embodiments, the process 600 includes, at step/operation 604, receiving one or more data parameters. For example, the platform tracking device 300 may receive one or more data parameters. The one or more data parameters may define one or more data types for logging and/or transmission by the platform tracking device 300. For instance, the platform tracking device 300 may include a plurality of sensors respectively configured to generate sensor data of a plurality of different sensor data types. The plurality of sensors, for example, may include a temperature sensor, an accelerometer, a magnetometer, and/or a location tracking component. In some examples, the one or more data parameters may identify one or more selected data types of the plurality of different sensor data types. For example, the one or more data parameters may assign which of the plurality of sensors to use, for example: temperature, motion, magneto meter, etc. The selection of which sensors to use may be driven by one or more user policies and may be tailored to decrease power consumption, increase monitored aspects of a platform, and/or the like.

In some embodiments, the location tracking component is configured to generate location data associated with one or more location data types and the one or more data parameters identify a selected location data type of the one or more location data types. The one or more location data types, for example, may include a cellular-based location type, a Wi-Fi-based location type, a GNSS-based type, and/or the like. The one or more data parameters may provide an option of using one or more combinations of the cellular, Wi-Fi, and/or GNSS data to determine a location of a platform. Cellular may provide the least accurate location, whereas Wi-Fi and ultimately GPS provide more accurate readings at a higher power expenditure.

The platform tracking device 300 may acquire location data using cellular, Wi-Fi, and/or GPS. Logic may be built into the platform tracking device 300 to attempt Wi-Fi first, followed by cellular, and if neither result in valid data, GPS may be attempted. This logic may be implemented to save power as a GPS attempt is the most power consuming.

In some embodiments, the process 600 includes, at step/operation 606, configuring platform-specific transmission parameters. For example, the platform tracking device 300 may configure platform-specific transmission parameters to establish a transmission content and frequency specific to a platform. The platform tracking device 300 can leverage the platform-specific transmission parameter to report sensor data as frequently as 5-minute intervals, up to once every 3 days. The more often the platform tracking device 300 is configured to report, the shorter the battery life may be.

In some embodiments, the process 600 includes, at step/operation 608, receiving sensor data. For example, the platform tracking device 300 receive the sensor data, using the plurality of sensors, at one or more sensor-based frequencies that are different than the transmit frequency. In some examples, the sensor data may be periodically captured by the plurality of sensors based at least in part on a log frequency that may be the same or different from the transmit frequency.

In some embodiments, the process 600 includes, at step/operation 610, storing the sensor data based at least in part on platform-specific transmission parameters. For example, the platform tracking device 300 may store a data log indicative of the portion of the sensor data based at least in part on the transmit frequency and the one or more data parameters. In some examples, the data log may be stored in response to a connectivity fault between the platform tracking device 300 and a remote system. By way of example, when the platform tracking device 300 is not connected to the network, it may continue to store sensor data offline in its onboard memory. The onboard memory on the platform tracking device 300 can store 6 months' worth of sensor logs.

In some embodiments, the process 600 includes, at step/operation 612, emitting a transmission based at least in part on the platform-specific transmission parameters. For example, the platform tracking device 300 may provide a radio transmission indicative of a portion of the sensor data based at least in part on the transmit frequency and the one or more data parameters.

For instance, the platform tracking device 300 may determine that an elapsed time from a previous radio transmission satisfies a period of time and, in response to the elapsed time satisfying the period of time, generate the radio transmission based at least in part on one or more most recent sensor measurements from the plurality of sensors and provide the radio transmission to a remote system (e.g., computing entity 506, user computing entity 508, etc.).

In addition, or alternatively, the platform tracking device 300 may provide a radio transmission in response to an event-based trigger. An event-based trigger, for example, may be identified based at least in part on temperature data (e.g., out of bound temperature range, etc.), movement data (e.g., accelerometer data indicative of movement of a platform, etc.), and/or the like.

In some examples, the portion of the sensor data is based at least in part on the one or more selected data types. In some examples, the portion of the sensor data may be based at least in part on selected location data type. For example, the portion of sensor data may identify a current location of a platform at a scheduled interval according to a selected location data type.

Figure 18:
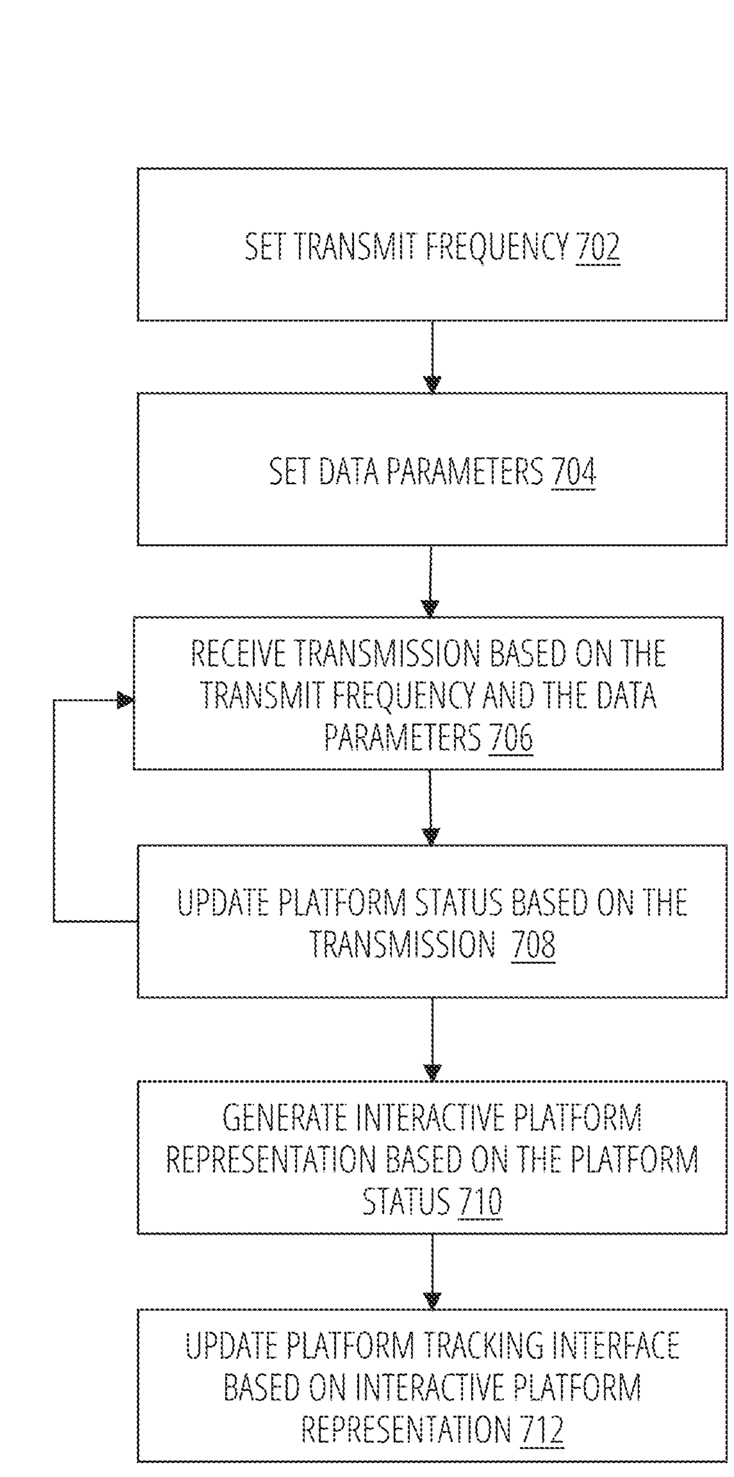
FIG. 18 is a flowchart diagram illustrating an example process in accordance with various embodiments of the present disclosure.

FIG. 18 is a flowchart diagram illustrating an example process 700 in accordance with various embodiments of the present disclosure. The flowchart depicts a platform-specific tracking process 700 for improving the tracking capabilities of platforms and products placed thereon. The process 700 may be implemented by one or more computing devices, entities, and/or systems described herein. For example, via the various steps/operations of the process 700, a computing system (e.g., computing entities 506, user computing entities 508, etc.) may leverage improved tracking capabilities to receive sensor data tailored to one or more user-defined constraints. By doing so, the process 700 enables platform-specific tracking operations that may selectively track more or less attributes of a platform's environment based at least in part on the circumstances. Ultimately, this allows for the conservation of computing resources, including local memory and power supplies of a plurality of platforms, while providing enhanced tracking capabilities that may be adapted to various circumstances.

FIG. 18 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, setting a transmit frequency for a platform. For example, the computing system may receive user input that identifies a transmit frequency specific to a platform and/or a set of platforms associated with a user. The transmit frequency may be transmitted to a respective platform tracking device for each of the platforms to establish a tracking frequency for the platforms.

In some embodiments, the process 700 includes, at step/operation 704, setting one or more data parameters for the platform. For example, the computing system may receive user input that identifies sensor data of interest specific to a platform and/or a set of platforms associated with a user. The data parameters may be transmitted to a respective platform tracking device for each of the platforms to collect sensor data of interest at the platforms.

In some embodiments, the process 700 includes, at step/operation 706, receiving a transmission based at least in part on the transmit frequency and the one or more data parameters. For example, the computing system may receive a transmission from a platform tracking device associated with each of a plurality of platforms associated with a user. In this manner, a user may monitor the location and contextual attributes of each platform. In some examples, each transmission may identify a source of location data and/or contextual attributes (e.g., whether cellular, Wi-Fi, or GPS is used report its location, etc.).

In some embodiments, the process 700 includes, at step/operation 708, updating a platform status based at least in part on the transmission. For example, the computing system may update a location and/or one or more contextual attributes of a platform based at least in part on the transmission.

In some embodiments, the process 700 includes, at step/operation 710, generating an interactive platform representation based at least in part on the platform status. For example, the computing system may generate a visual representation of the platform based at least in part on the platform status.

In some embodiments, the process 700 includes, at step/operation 712, updating a platform tracking interface based at least in part on the interactive platform representation. For example, the computing system may update a platform tracking interface based at least in part on the interactive platform representation. In this manner, a user may view data for the platforms (e.g., as provided by respective platform tracking devices, etc.) allocated to a user's account.

FIG. 19 is an operational example of a platform tracking interface 800 in accordance with various embodiments of the present disclosure. As depicted, the platform tracking interface 800 may include an interactive mapping graphical interface 802. In some examples, an interactive platform representation 804 may be positioned within the interactive mapping graphical interface 802 based at least in part on a transmission received from a platform tracking device. The interactive platform representation 804, for example, may be placed at a location within the interactive mapping graphical interface 802 based at least in part on location data indicative of a geographical location of the platform.

In addition, or alternatively, the interactive platform representation 804 may provide one or more contextual details (e.g., a temperature, speed, etc.) of a platform. The contextual details may be represented by a color scheme, text, shading, images, and/or the like. By way of example, a color scheme may be used to identify a platform that is within a temperature range (e.g., green indicating that product and/or platform tracking device is not impacted by a recorded temperature, etc.) and/or outside a temperature range (e.g., red indicating that product and/or platform tracking device may be impacted by a recorded temperature, etc.). By way of example, a platform tracking device may have an operating temperature range between −18 degrees Celsius and 60 degrees Celsius. In some examples, the contextual details may represent whether a current temperature is within the operating temperature range.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the disclosure.

The invention claimed is:

1. A platform comprising:

a top deck that includes an upper surface and an opposing lower surface, with a plurality of spaced apart platform support leg openings extending through the upper and lower surfaces;

a plurality of platform support legs extending from the lower surface of said top deck and aligned with the plurality of platform support leg openings, each platform support leg comprising:

an upper portion adjacent the lower surface of said top deck and having an opening extending through a first pair of spaced apart sidewalls, and a lower portion adjacent the upper portion and including a pair of extensions extending outwards from a bottom surface of the lower portion, with the opening in the upper portion providing clearance for the pair of extensions on the platform support leg of the identical platform when stacked thereon; and a platform tracking device comprising an exterior housing assembly that is positioned at least partially within the top deck and encloses processing circuitry, memory, one or more sensors, a communication element, and a power supply.

2. The platform according to claim 1, wherein the communication element comprises a radio frequency (RF) transmitter and an RF receiver configured to operate according to a wireless data transfer standard.

3. The platform according to claim 2, wherein the wireless data transfer standard comprises a Category M (CAT-M) standard, a Narrowband-Internet of Things (NB-IoT) standard, a Wireless Fidelity (Wi-Fi) standard, or a Bluetooth Low Energy (BLE) standard.

4. The platform according to claim 1, the one or more sensors comprise a temperature sensor, an accelerometer, a magnetometer, or a location tracking component.

5. The platform according to claim 1, wherein the platform tracking device is mounted within the top deck by one or more mounting screws.

6. The platform according to claim 1, wherein the platform tracking device is positioned within a tracking device gap of the top deck.

7. The platform according to claim 6, wherein the tracking device gap extends a distance within the top deck from the lower surface.

8. The platform according to claim 7, wherein one or more dimensions of the tracking device gap are based on one or more dimensions of the exterior housing assembly.

9. The platform according to claim 7, wherein the distance is greater than or equal to a depth of the exterior housing assembly.

* * * * *